(12) United States Patent
Syukri

(10) Patent No.: US 6,836,790 B1
(45) Date of Patent: Dec. 28, 2004

(54) E-MAIL SYSTEM AND INCOMING E-MAIL CHECK METHOD

(75) Inventor: Agus Fanar Syukri, Tokyo (JP)

(73) Assignee: NEC Corporation, Tokyo (JP)

( * ) Notice: Subject to any disclaimer, the term of this patent is extended or adjusted under 35 U.S.C. 154(b) by 823 days.

(21) Appl. No.: 09/703,865

(22) Filed: Nov. 2, 2000

(30) Foreign Application Priority Data

Nov. 10, 1999 (JP) .......................................... 11-320106

(51) Int. Cl.[7] .............................................. G06F 15/16
(52) U.S. Cl. ........................ 709/206; 379/88.26; 707/8; 707/10
(58) Field of Search ....................... 709/206; 707/8–10; 379/88.26

(56) References Cited

U.S. PATENT DOCUMENTS

| | | | |
|---|---|---|---|
| 5,475,737 A | * 12/1995 | Garner et al. | ............ 379/88.26 |
| 5,812,770 A | 9/1998 | Sakai | |
| 6,304,896 B1 | 10/2001 | Fujiki | |
| 6,360,220 B1 | * 3/2002 | Forin | ............................ 707/8 |
| 6,374,246 B1 | * 4/2002 | Matsuo | ........................ 707/10 |

FOREIGN PATENT DOCUMENTS

| | | |
|---|---|---|
| JP | 5-022339 | 1/1993 |
| JP | 9-219887 | 8/1997 |
| JP | 9-321792 | 12/1997 |
| JP | 10-222447 | 8/1998 |
| JP | 11-046216 | 2/1999 |
| JP | 11-112549 | 4/1999 |
| JP | 11-220548 | 8/1999 |
| JP | 11-238025 | 8/1999 |
| JP | 11-252156 | 9/1999 |
| JP | 11-261630 | 9/1999 |
| JP | 11-345185 | 12/1999 |

* cited by examiner

*Primary Examiner*—Wen-Tai Lin
(74) *Attorney, Agent, or Firm*—Foley & Lardner LLP

(57) ABSTRACT

The present invention provides an e-mail system and an incoming e-mail check method in which a client can know whether a new e-mail addressed to the client has arrived at a server at a stage before the client is connected to the server. The system includes a mail managing table, means for moving a client having a higher incoming mail check frequency to an upper line of the mail managing table, and means for moving a record of a client having a lower incoming mail check frequency to a lower line of the mail managing table.

18 Claims, 21 Drawing Sheets

E-MAIL SYSTEM AND INCOMING E-MAIL CHECK METHOD

BACKGROUND OF THE INVENTION

1. Field of the Invention

The present invention relates to an e-mail delivery technique and in particular, to an e-mail system and an incoming e-mail check method for checking presence/absence of an e-mail addressed to a client in a server at a stage before the client (i.e., client's personal computer) is connected to the server.

2. Description of the Related Arts

In a conventional e-mail system, in order to receive an e-mail, the client is connected by dial connection through an arbitrary telephone line to a contracted service provider, a client mail box present in a mail server of the provider is accessed, and a data accumulated in the mail box is downloaded.

In such a conventional e-mail system, an e-mail comes into the mail box of the provider and the client should access his/her mail box to check whether an e-mail addressed to him/her is present.

Moreover, if the clients frequently addresses his/her mail box to check incoming mails in a condition approximately at a real time, the client is charged each time for a dial connection through an arbitrary telephone line to the provider. And if no incoming e-mail is present in the mail box, this means that the line has been occupied in vain.

Thus, in the conventional technique, when no incoming mail is present in the mail box of the server, the line between the client and the server is occupied in vain because an e-mail comes into a mail box of a server of a provider, and a client should access the client's mail box in the server to check whether an e-mail addressed to the client is present regardless of presence/absence of any incoming mail.

SUMMARY OF THE INVENTION

It is therefore an object of the present invention to provide an e-mail system and an incoming e-mail check method which enable a client to determine whether an incoming e-mail is present in a server before the client is connected to the server.

The e-mail system according to the present invention includes a plurality of clients and a server having a mail managing table, in which a record of a client having a higher incoming mail check frequency is moved to an upper line of the mail managing table, and a record of a client having a lower incoming mail check frequency is moved to a lower line of the mail managing table.

According to another aspect of the present invention, the clients have a dial response decision unit used for checking whether an incoming mail is present in the server in such a manner that if a dial-up telephone is accepted within a predetermined ring count, it is decided that an incoming mail is present, and if the dial-up telephone is not accepted within the predetermined ring count, it is decided that no incoming mail is present.

According to still another aspect of the present invention, the server includes means for processing an incoming mail check request dial from a client in such a manner that the dial is accepted within a predetermined ring count according to a signal indicating that an incoming mail is present while the dial is not accepted within the predetermined ring count according to a signal indicating that no incoming mail is present.

According to yet another aspect of the present invention, the clients have a dial response decision unit used for checking whether an incoming mail is present in the server in such a manner that if a dial-up telephone is accepted within a predetermined dial time (time elapse after a dial start), it is decided that an incoming mail is present, and if the dial-up telephone is not accepted within the predetermined dial time, it is decided that no incoming mail is present.

According to still yet another aspect of the present invention, the server includes means for processing an incoming mail check request dial from a client in such a manner that the dial is accepted within a predetermined dial time according to a signal indicating that an incoming mail is present while the dial is not accepted within the predetermined dial time according to a signal indicating that no incoming mail is present.

According to further yet another aspect of the present invention, the clients have a dial response decision unit used for checking whether an incoming mail is present in the server in such a manner that if a dial-up telephone is accepted within a predetermined dial count, it is decided that an incoming mail is present, and if the dial-up telephone is not accepted within the predetermined dial time, it is decided that no incoming mail is present.

According to yet another aspect of the present invention, the clients have a dial response decision unit for deciding that an incoming mail is present if a dial number having an ISDN sub-address transmitted by a client is accepted by the server and that no incoming mail is present if the dial number is not accepted by the server.

According to still yet another aspect of the present invention, the server has means for processing an incoming mail check request having an ISDN sub-address from the client in such a manner that the dial is accepted if an incoming mail is present and the dial is not accepted if no incoming mail is present.

The incoming e-mail check method according to the present invention includes: a step for holding a record of a client having a higher incoming mail check frequency in an upper line of a mail managing table, and a step for holding a record of a client having a lower incoming mail check frequency in a lower line of the mail managing table.

According to another aspect of the present invention, the method further includes a dial response decision step for a user to check whether an incoming mail is present in the server, i.e., if a dial-up telephone is accepted within a predetermined ring count, it is decided that an incoming mail is present, and if the dial-up telephone is not accepted within the predetermined ring count, it is decided that no incoming mail is present.

According to yet another aspect of the present invention, the method further includes a step for processing an incoming mail check request dial from a client in such a manner that the dial is accepted within a predetermined ring count according to a signal indicating that an incoming mail is present while the dial is not accepted within the predetermined ring count according to a signal indicating that no incoming mail is present.

According to still yet another aspect of the present invention, the method further includes a dial response decision step for a client to check whether an incoming mail is present in the server in such a manner that if a dial-up telephone is accepted within a predetermined dial time (time elapse after a dial start), it is decided that an incoming mail is present, and if the dial-up telephone is not accepted within the predetermined dial time, it is decided that no incoming mail is present.

According to yet still another aspect of the present invention, the method further includes a step for processing an incoming mail check request dial from a client in such a manner that the dial is accepted within a predetermined dial time according to a signal indicating that an incoming mail is present while the dial is not accepted within the predetermined dial time according to a signal indicating that no incoming mail is present.

According to still further aspect of the present invention, the method further includes a dial response decision step for checking whether an incoming mail is present in the server in such a manner that if a dial-up telephone is accepted within a predetermined dial count, it is decided that an incoming mail is present, and if the dial-up telephone is not accepted within the predetermined dial time, it is decided that no incoming mail is present.

According to yet still another aspect of the present invention, the method further includes a dial response decision step for deciding that an incoming mail is present if a dial number having an ISDN sub-address transmitted by a client is accepted by the server and that no incoming mail is present if the dial number is not accepted by the server.

According to still further aspect of the present invention, the method further includes a step for processing an incoming mail check request having an ISDN sub-address from a client in such a manner that the dial is accepted if an incoming mail is present and the dial is not accepted if no incoming mail is present.

DESCRIPTION OF THE PREFERRED EMBODIMENTS

The incoming e-mail check method and system according to the present invention is characterized in the configuration that a client can check presence/absence of a new incoming e-mail (hereinafter, referred to simply as an incoming mail) addressed to the client in a server at a stage before the client is connected to the server.

That is, the client uses a dial to check whether an incoming mail is present. If no incoming mail addressed to the client is present, the dial is not accepted by the server until a predetermined ring count, or a predetermined dial count, or a predetermined dial time is reached, so that the client can know that no incoming mail is present. On the other hand, if an incoming mail addressed to the client is present, the server accepts the dial before reaching the predetermined ring count or the predetermined dial count or the predetermined dial time. This is the characteristic common to embodiments detailed below.

Here, the term "dial" means a call signal transmission start from a communication apparatus to another communication apparatus through a communication line. Moreover, the term "dial count" means the number of times the dial is performed. Furthermore, the "dial time" means the time has elapsed after the dial is started. Moreover, the term "ring" means a call signal output by one dial from a communication apparatus to another communication apparatus. For example, a call signal of the telephone communication makes a bell ring. Moreover, the term "ring count" means the number of times the call signal is transmitted.

Thus, when no incoming mail is present in the server, the client need not be connected to the server, thereby realizing the incoming e-mail check method and system which can reduce the occupied state of the line between the client and the server. Hereinafter, embodiments of the present invention will be detailed with reference to the attached drawings.

[Embodiment 1]

Figure 1:
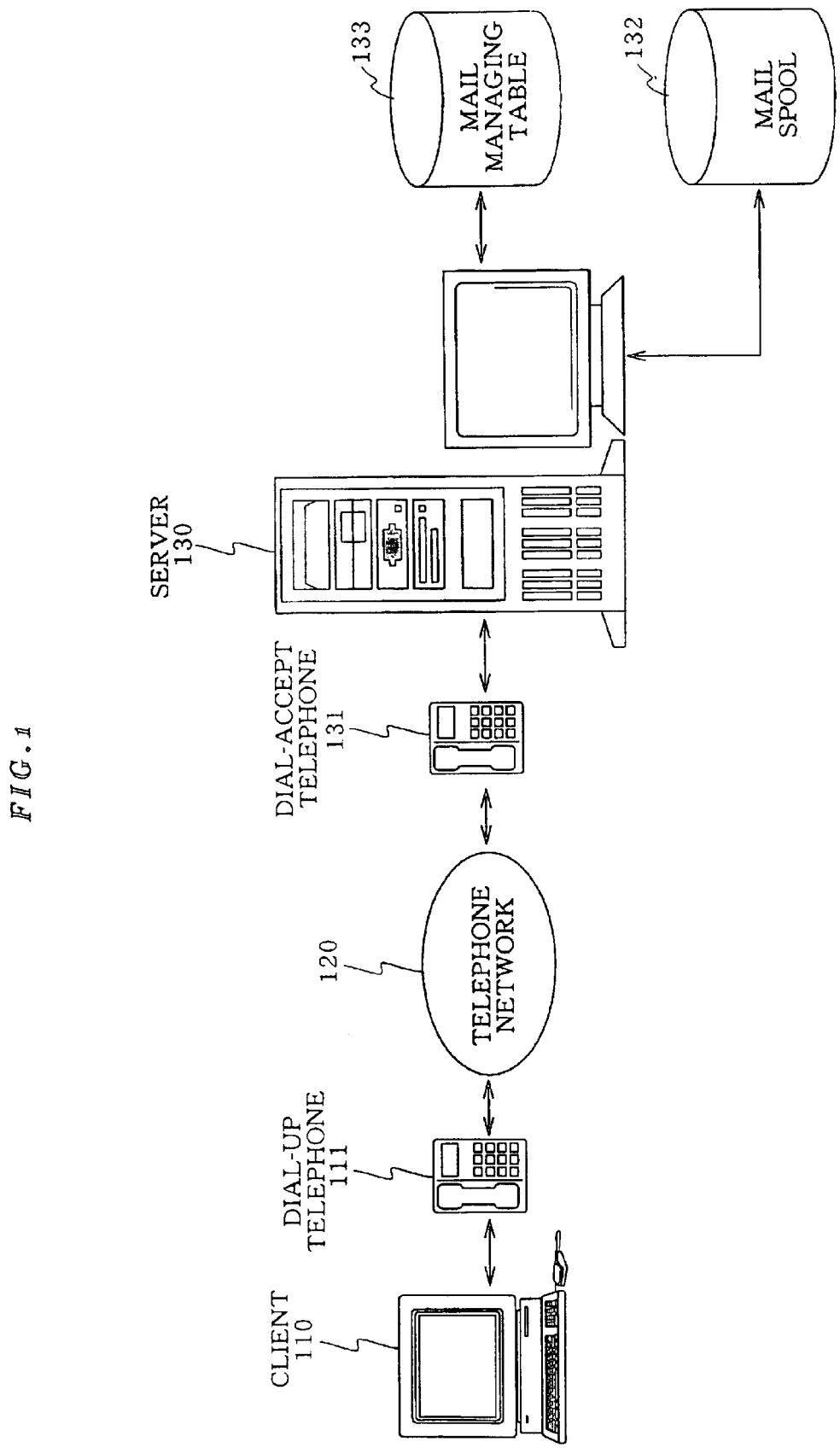
FIG. 1 shows a configuration of a system realizing an incoming e-mail check method according to the present invention.

FIG. 1 shows a configuration of a system based on the incoming male check method according to an embodiment of the present invention. The system includes a client computer (hereinafter, referred to as a client) 110 operated by a program control, a dial-up telephone 111 of the client 110, a telephone network 120, a server computer (hereinafter, referred to as a server) 130 operated by a program control, a dial-accept telephone 131 of the server 130, a mail spool 132, and a mail managing table 133.

Figure 2:
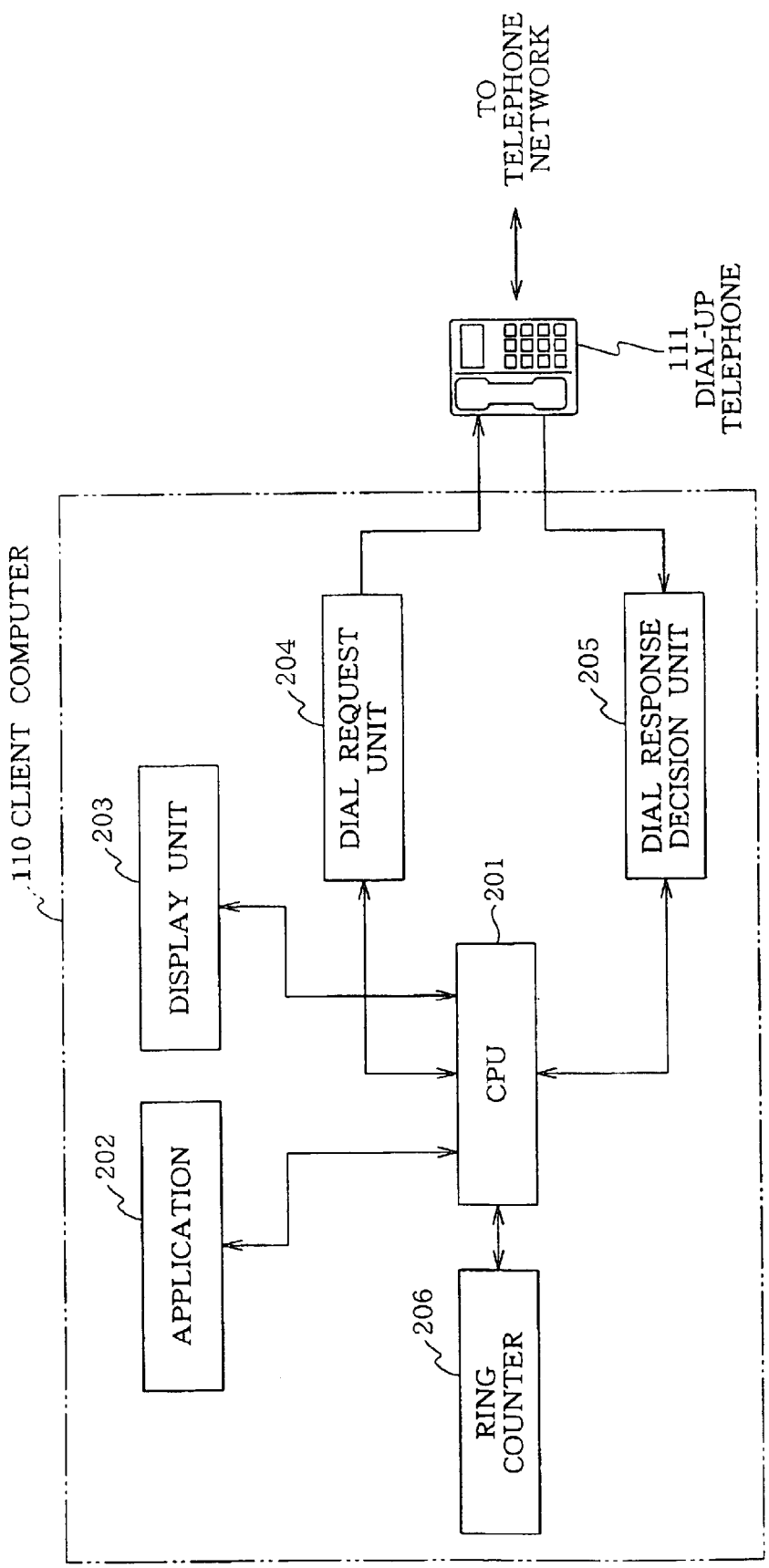
FIG. 2 shows a configuration of a client in a system based on the incoming mail check method using the ring count.

FIG. 2 shows a configuration of the client 110 in a system based on the incoming mail check method using the ring count. Referring to FIG. 2, the client 110 includes a CPU 201, an application program (hereinafter, referred to as an application) 202, a display unit 203, a dial request unit 204, a dial response decision unit 205, and a ring counter 206.

These components operate as follows. The CPU 201 controls operation of the client 110. The application 202 serves as an interface between the CPU 201 and a user using the client 110 and includes a mail transmission/reception application 202 and a browser application 202. The display unit 203 displays a processing operation or processing result for the user using the client 110.

Moreover, the dial request unit 204 is used for connection request made via the CPU 201 to another computer (not depicted) through a telephone network 120. When performing a dial, the information on the telephone number of the client 110 is also transmitted.

Moreover, the dial response decision unit 205 is used to check a dial response from another computer (not depicted) such as the server 130. The dial response decision unit 205 decides whether a dial request can be accepted and performs a processing to determine whether an incoming mail is present. The dial response decision unit 205 has a decision function operating as follows. For example, if the dial is accepted by the server 130 when the ring count is 5 is below, then it is determined that an incoming mail is present; if the dial is not accepted by the server 130 when the ring count is 6 to 10, then it is determined that no incoming mail is present; and if the dial is not accepted by the server 130 when the ring count exceeds 10, then it is determined that the server 130 cannot respond.

Moreover, the ring counter 206 is used for calculating the number of times ring is made when the client 110 dials to another computer (not depicted).

Figure 3:
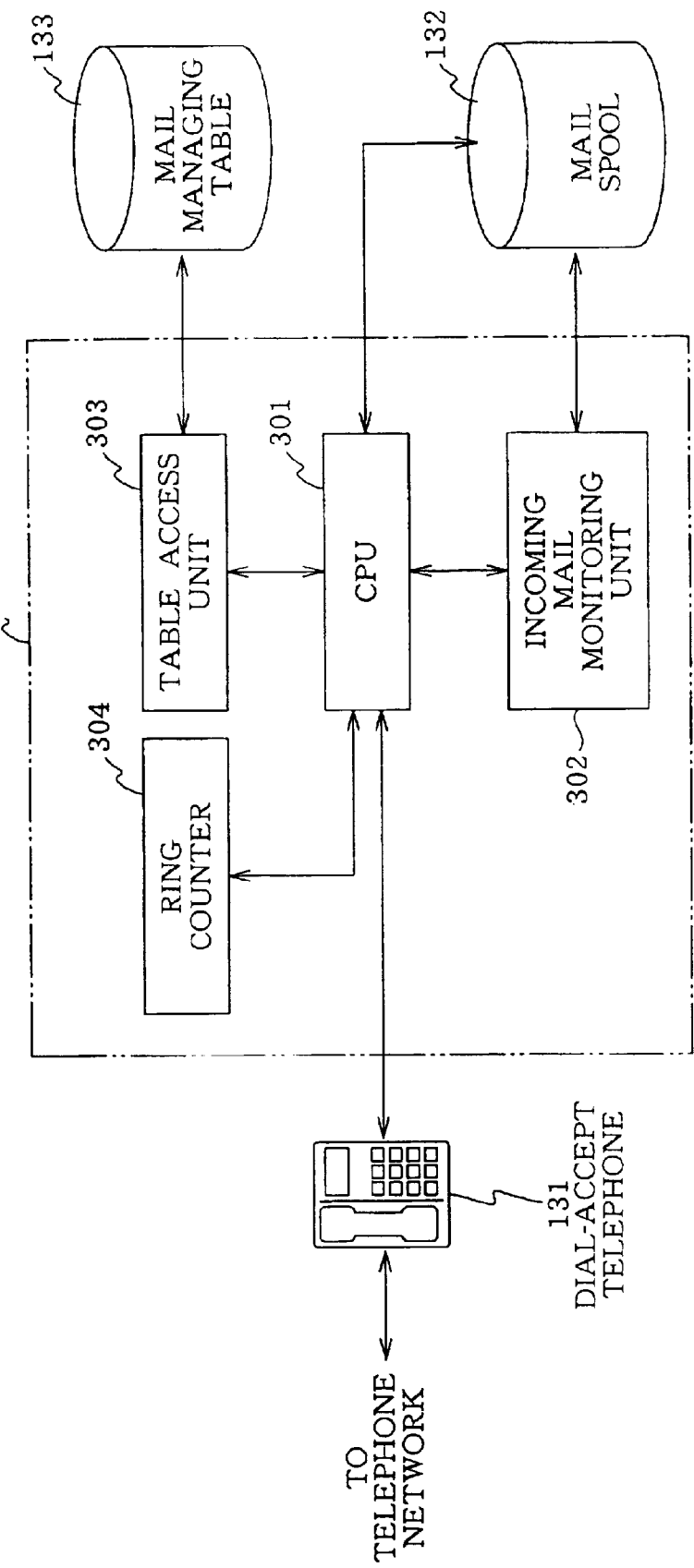
FIG. 3 shows a configuration of a server in the system based on the incoming mail check method using the ring count.

FIG. 3 shows a configuration of the server 130 in the system based on the incoming mail check method using the ring count. Referring to FIG. 3, the server 130 includes a CPU 301, an incoming mail monitoring unit 302, a table access unit 303, and a ring counter 304.

These components operate as follows. The CPU 301 controls the operation of the entire server 130.

The incoming mail monitoring unit 302 monitors whether a new e-mail has arrived in the mail spool 132 of the server computer 130. If a new incoming mail is present, the client 110 to whom the mail is addressed is reported to the CPU 301.

Table 1 is a mail managing table 133. The table access unit 303 is used when the CPU 301 reads a data from the mail managing table 133 and writes a data into the mail managing table 133. As shown in FIG. 1, the mail managing table 133 has a plurality of records (lines), each record (line) containing a column of a telephone number (addresser number) of the client 110, a column of the user ID of the client, and an incoming mail column having an information (1 or 0) indicating whether an incoming mail addressed to the client 110 is present. When a presence of an incoming mail is reported from the incoming mail monitoring unit 302, the CPU 301 updates the value of the incoming mail column to "1" in the line of the client 110 to which the mail is addressed. On the other hand, if no incoming mail is present, the value of the incoming mail column is set to "0"

as a default value. When all the incoming mails are fetched by the client 110, the value of the incoming mail column is reset to "0" in the mail managing table 133.

TABLE 1

| Telephone number | User ID | Incoming mail |
|---|---|---|
| 03-2222-2222 | User02 | 1 |
| 03-3333-3333 | User03 | 1 |
| ... | ... | ... |
| ... | ... | ... |
| ... | ... | ... |
| 03-1111-1111 | User01 | 0 |

The ring counter 304 counts the number of times ring has made by the client 110 via the dial-accept telephone 131.

Next, explanation will be given on the operation (incoming mail check method) of the e-mail system according to the present embodiment. Firstly, it is assumed that as shown in FIG. 1, the user who wants to check whether an incoming mail is present in the server 130 has loaded the telephone number of the client 110 and the mail user ID information in the server. Secondly, it is assumed that the processing by the CPU 301 is designed so that the mail managing table 133 is constantly updated in such a manner that a record of a client 110 having a higher incoming mail check frequency is positioned at a higher line (i.e., data storage area near the first address accessed by the CPU 301) and a record of a client 110 having a lower incoming mail check frequency is positioned at a lower line in the table, so that the average access time by the CPU 301 is reduced, i.e., a necessary record is accessed by the CPU 301 at a higher speed. Thirdly, it is assumed that before dialing to the server 130, the user of the client 110 selects a service request to the server 130. Here, the "service" means that the server 130 can provide a response to the client 110 in response to the request from the client 110. For example, the service may be an incoming mail check, e-mail transmission/reception, file transfer on the internet, and the like.

Figure 4:
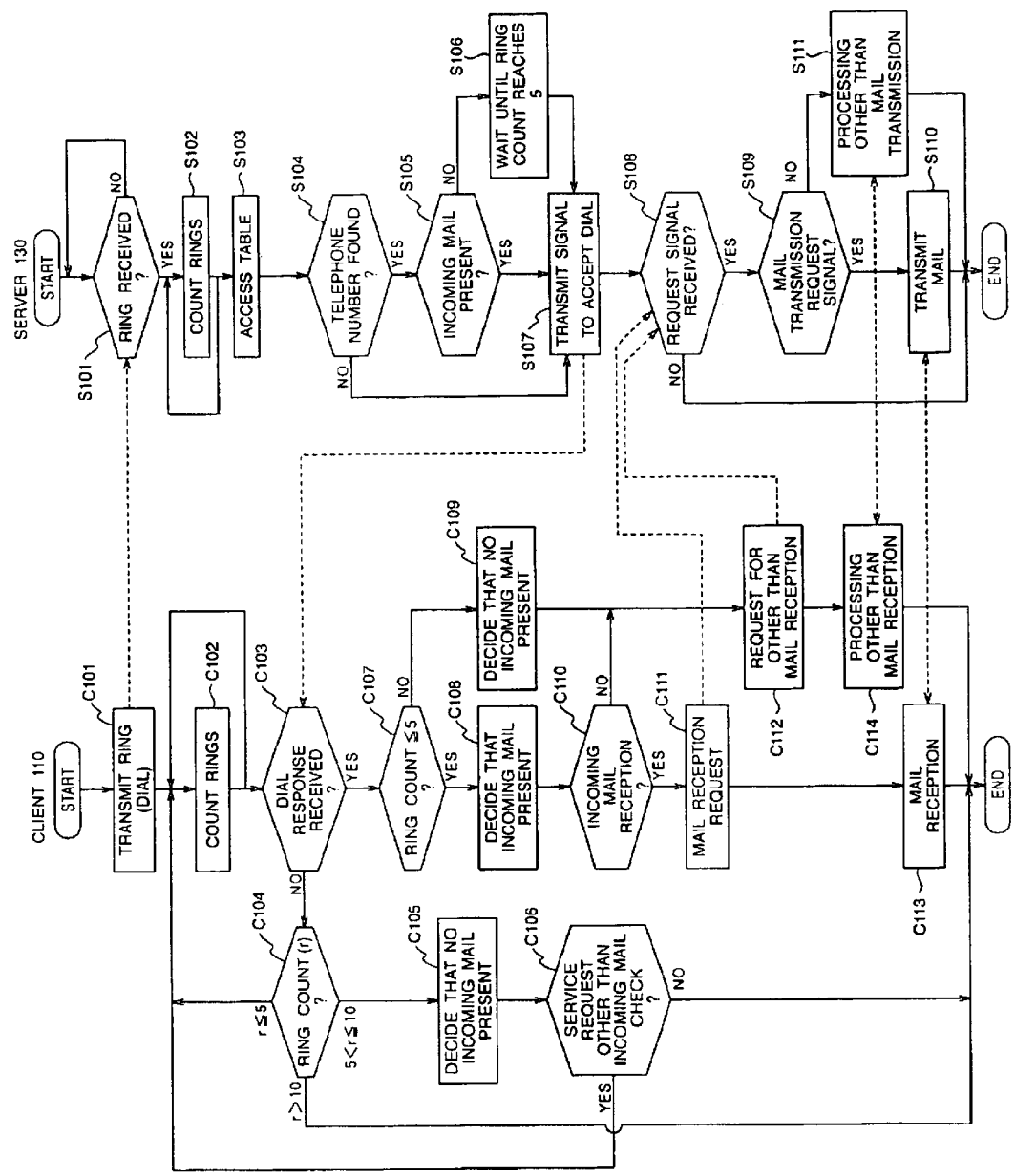
FIG. 4 is a flowchart of the system based on the incoming mail check method using the ring count.

Description will now be directed to the operation of the embodiment with reference to the system configuration in FIG. 1, the configuration of the client 110 in FIG. 2, the configuration of the server 130 in FIG. 3, the flowchart in FIG. 4, and the mail managing table 133 in Table 1.

Firstly, explanation will be given on the operation of the client 110. FIG. 4 is a flowchart of the incoming mail check method using the ring count. Referring to FIG. 1 and FIG. 4, in order to check whether an incoming mail addressed to the client 110 is present in the server 130, firstly, the client 110 notifies the telephone number of the server 130 to the dial-up telephone 111. Next, the dial-up telephone 111 dials to the dial-accept telephone 131 of the server 130 via the telephone network 120 (step C101). The ring counter 206 counts the number of times ring is made until the dial-up telephone 111 receives a response to the dial from the server 130 (step C102).

Next, the CPU 201 determines whether the client 110 should receive the dial response via the dial-up telephone 111 (step C103). When the dial response is not to be received, the CPU 201 determines the ring count at that stage (step C104). When the dial response is not to be received even if the ring count is from 6 to 10, the client 110 determines that no incoming mail is present in the server by the dial response decision unit 205 (step C105). At this stage, the client 110 is not connected to the server 130 but it is known that no incoming mail addressed to the client 110 is present in the server 130. This incoming mail check result is transmitted to the display unit 203 to show the result to the user. Furthermore, the client 110 checks whether a request other than the incoming mail check in the server 130 is present (step C106). If no request is present other than the incoming mail check service, the dial is terminated. If a request other than the incoming mail check is present, the client 110 continues to dial until the dial is accepted by the server 130 (return to step C102).

On the other hand, at step C106, the client 110 continues dialing for a request other than the incoming mail check. If no dial response is received from the server 130 after the ring count exceeds 10, the client 110 determines by the dial response decision unit 205 that the server 130 cannot respond and terminates the operation.

On the other hand, at step C103, if the client 110 receives a dial response from the server 130, the client references the ring count when the dial response is received and checks whether the ring count is 5 or below (step C107). If the dial count at the time when the dial response is received is 5 or below, the client 110 determines that an incoming mail addressed to the client 110 is present in the server 130 (step C108). Next, it is decided whether to fetch the incoming mail (C110). When the incoming mail is to be fetched, the client 110 transmits a mail fetch request signal to the server 130 (step C111). Furthermore, the incoming mail is fetched (step C113) and the mail fetch result is transmitted to the display unit 203 to show the result to the user.

On the other hand, if the ring count at the time when the dial response is received by the client 110 exceeds 5, it is determined that no incoming mail addressed to the client 110 is present in the server 130 (step C109). Even when the dial is accepted and an incoming mail is present in the server, the client 110 can make a request other than the incoming mail fetch (such as a mail transmission request and a file transfer request on the internet). In such a case, the client 110 transmits a processing request signal other than the mail reception (step C112), and the server performs the requested transmission/reception processing (step C114).

Next, explanation will be given on the operation of the server 130. In this embodiment, firstly, the server 130 receives a dial request from the client 110 via the dial-accept telephone 131 (S101). Next, the CPU 301 of the server 130 starts the ring counter 304 to count the number of rings from the client 110 (step S102) Furthermore, the CPU 301 accesses the mail managing table 133 (step S103) and checks the telephone number of the client 110 (step S104). If the telephone number of the client 110 is present in the mail managing table 133, the CPU 301 checks whether an incoming male addressed to this client 110 is present (step S105). On the other hand, if the telephone number of the client 110 cannot be found, the server 130 determines that the client 110 cannot have the incoming mail check service at the dial stage and transmits a control signal indicating that the dial is to be accepted by the dial-accept telephone 131 (step S107).

On the other hand, at step S105, if it is determined that an incoming mail addressed to the client 110 is present, the server 130 transmits a control signal indicating the dial-accept telephone 131 to accept the dial. On the other hand, if it is determined that no incoming mail is present, the server waits until the ring count reaches 5 (step S106) and then transmits a control signal indicating the dial-accept telephone 131 to accept the dial (step S107).

Lastly, the server 130 accepts the dial from the client 110 and a connection is established between the client 110 and the server 130. The server 130 waits until a request signal is received from the client 110 (step S108). Upon reception of the request signal from the client 110, control is passed to the next processing. That is, the server 130, upon reception of the request signal from the client 110, determines whether the request signal is an incoming mail transmission request (step S109). If the request signal from the client 110 is a mail transmission request signal, the server transmits the mail (S110). On the other hand, if the request is other than the mail transmission request signal, the server 130 performs a requested transmission/reception processing (step S111). If no request signal from the client 110 is present, the server 130 disconnects the connection and terminates the operation.

Next, explanation will be given on an example of the incoming mail check operation performed when no incoming mail is present. In this embodiment, for example, as shown in Table 1, it is assumed that an incoming mail addressed to User01 has been downloaded from the server 130 and no incoming mail is currently present for User01. For example, it is assumed that the telephone number of the client 110 of User01 is 03-1111-1111.

When the server 130 has received a dial from the client 110 of the User01 (step S101), the server 130 firstly counts the rings (step S102). Then, the server 130 accesses the mail managing table 133 (step S103) and checks whether the telephone number of the client 110 currently dialing is present in the table 133. If the "03-1111-1111" is present, the server 130 checks whether an incoming mail addressed to User 01 is present (step S105). As shown in Table 1, since the flag in the incoming mail column of User 01 is "0", the server 130 determines that no incoming mail is present and waits until the ring count reaches 5 (step S106). If the client 110 does not receive the dial response while the ring count is 6 to 10, the dial response decision unit 105 determines that no incoming mail is present in the server 130 (step C105). At this stage, the client 110 remains unconnected to the server 130 but it is known that no incoming mail addressed to the client 110 is present in the server 130. This incoming mail check result is transmitted to the display unit 203 for the user.

Next, the client 110 determines whether a request other than the incoming mail check service in the server 130 is present (step C106). If no other request than the incoming mail check service in the server 130 is present, the client 110 terminates the dialing. If a request other than the incoming mail check service is present, the client 110 continues dialing to the server 130 (return to step C102). Here, if the ring count from the client 110 exceeds 5, the server 130 transmits a control signal to the dial-accept telephone 131 so as to accept the dial (step S107).

Lastly, the server 130 accepts the dial of the client 110 and a connection is established between the client 110 and the server 130. The server 130 waits until a request signal is received from the client 110 (step S108). When a request signal is received from the client 110, control is passed to the next processing. That is, upon reception of the request signal, the server 130 identifies the request signal (step S109). If the request signal is a mail transmission request signal, the server 130 performs a mail transmission processing (step S110). On the other hand, if the request signal is not a mail transmission request signal, the server performs a transmission/reception processing requested (step S111). If no request signal is present in step S108, the server 130 terminates operation.

Next, explanation will be given on a specific example of the incoming mail check operation performed when an incoming mail is present. In this embodiment, as shown in Table 1, it is assumed, for example, that two incoming mails addressed to User02 are present. Moreover, it is assumed that User02 checks using the client 110 whether an incoming mail is present. Furthermore, it is assumed that the telephone number of the User02 client 110 is 03-2222-2222.

Firstly, explanation will be given on the processing performed when a new e-mail addressed to User02 has arraived at the server 130. In this embodiment, when a new mail addressed to User02 has arrived, the server 130 firstly stores the incoming mail in the mail spool 132. Next, the incoming mail monitoring unit 302 operates to notifiy the CPU 301 that an incoming mail is present for the specific client 110 as the destination. The CPU 301, according to the incoming mail notification from the incoming mail monitoring unit 302, retrieves the mail managing table 133 to find the client 110 "User02". If the client 110 is found, the server 130 updates the incoming mail column of the corresponding line to "1" if "0".

Next, upon reception of a dial request from the client 110 of User02 (step S101), the server 130 firstly counts the rings (step S102). Next, the server 130 accesses the mail managing table 133 (step S103) and identifies the telephone number of the client 110 currently dialing (step S104). If "03-2222-2222" can be identified in the mail managing table 133, the server 130 checks whether an incoming mail addressed to User02 is present (step S105). Since the incoming mail flag is set to "1", the server 130 determines that an incoming mail is present and transmits a control signal to the dial-accept telephone 131 so as to accept the dial (step S107).

Furthermore, when the server 130 has received an incoming mail reception request from the client 110 (steps S108 and S109), the server 130 performs a transmission of the incoming mail (step S110). Similarly, if a signal other than an incoming mail reception request is received (step S109), the server performs the requested service processing (step S111).

The present embodiment thus far described has following effects. Firstly, when no incoming mail is present in the server 130, there is no need of establishing a connection between the client 110 and the server 130. This reduces the line occupied state ratio in the line between the client 110 and the server 130. This is realized as follows. When the client 110 dials to check whether an incoming mail is present in the server 130, if no incoming mail is present, the server 130 can notify the client 110 that no incoming mail is present by not accepting the dial until a predetermined ring count (or dial count or ring time) is reached. Thus, the client 110 can know that no incoming mail addressed to the client 110 is present at the dialing stage without connecting the client 110 to the server 130.

Secondly, the client 110 can connect a request other than an incoming mail check to the server 130 at a high speed without being interfered by the incoming mail check. This can be realized because when the client 110 dials to the server 130, the client 110 has a function to add an ISDN sub-address after the telephone number of the client 110, and the server 130 has means to identify a service request from the client 110 according to the ISDN sub-address.

[Embodiment 2]

Description will now be directed to a second embodiment of the present invention with reference to the attached drawings. It should be noted that like components as in the first embodiment are denoted by like reference symbols and their explanations are omitted.

Figure 5:
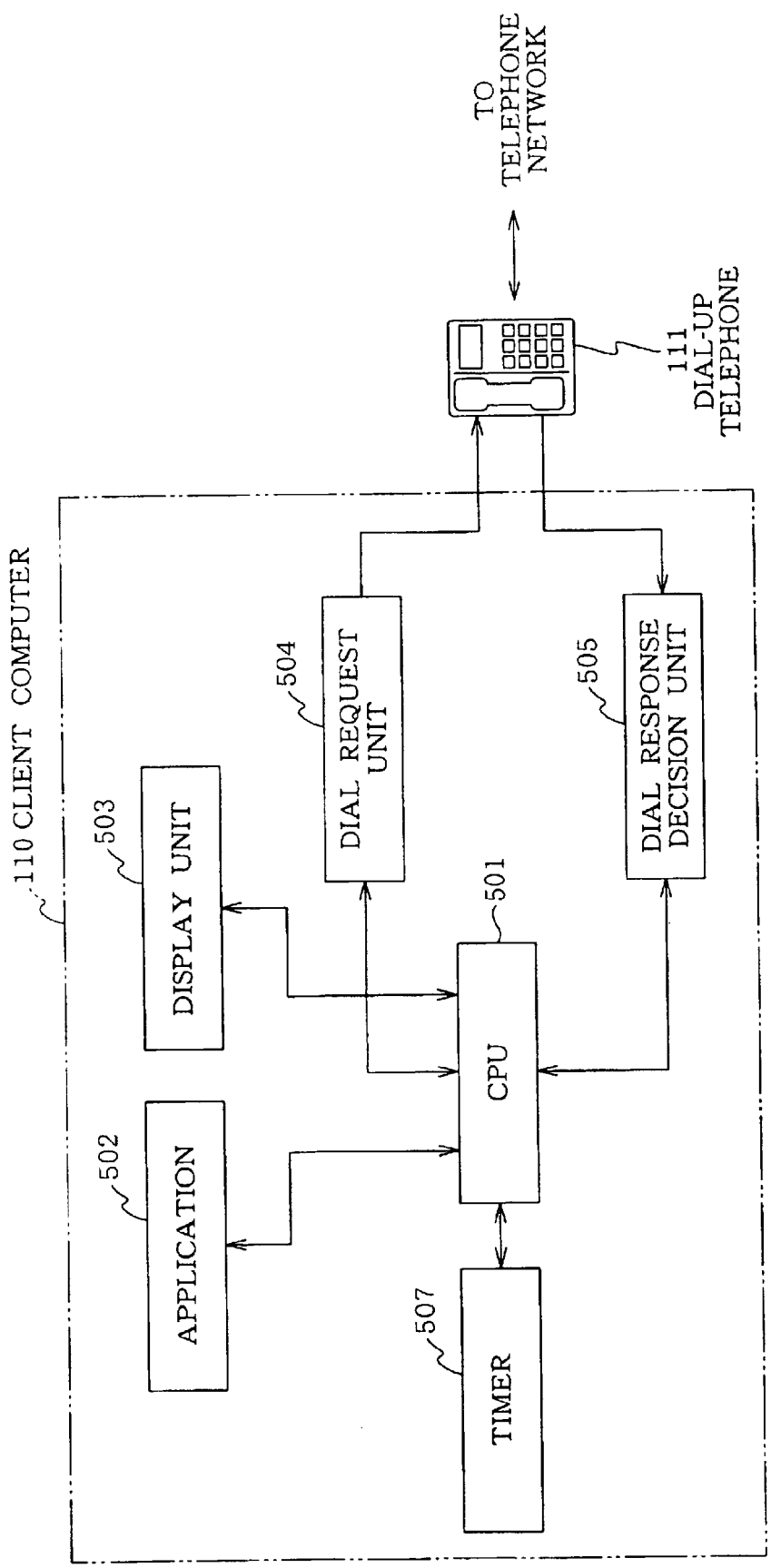
FIG. 5 shows a configuration of a client in a system based on the incoming mail check method using the dial time.

FIG. 5 shows a configuration of the client 110 in the system based on the incoming mail check method using the dial time. Referring to FIG. 5, the client 110 includes a CPU 501, an application 502, a display unit 503, a dial request unit 504, a dial response decision unit 505, and a timer 507. These components (501, 502, 503, 504, and 505) except the timer 507 have identical configurations as the components (201 to 205) in the first embodiment and their explanations are omitted. The timer 507 is used by the client 110 to count the dial time, the processing time, wait time, and the like.

Figure 6:
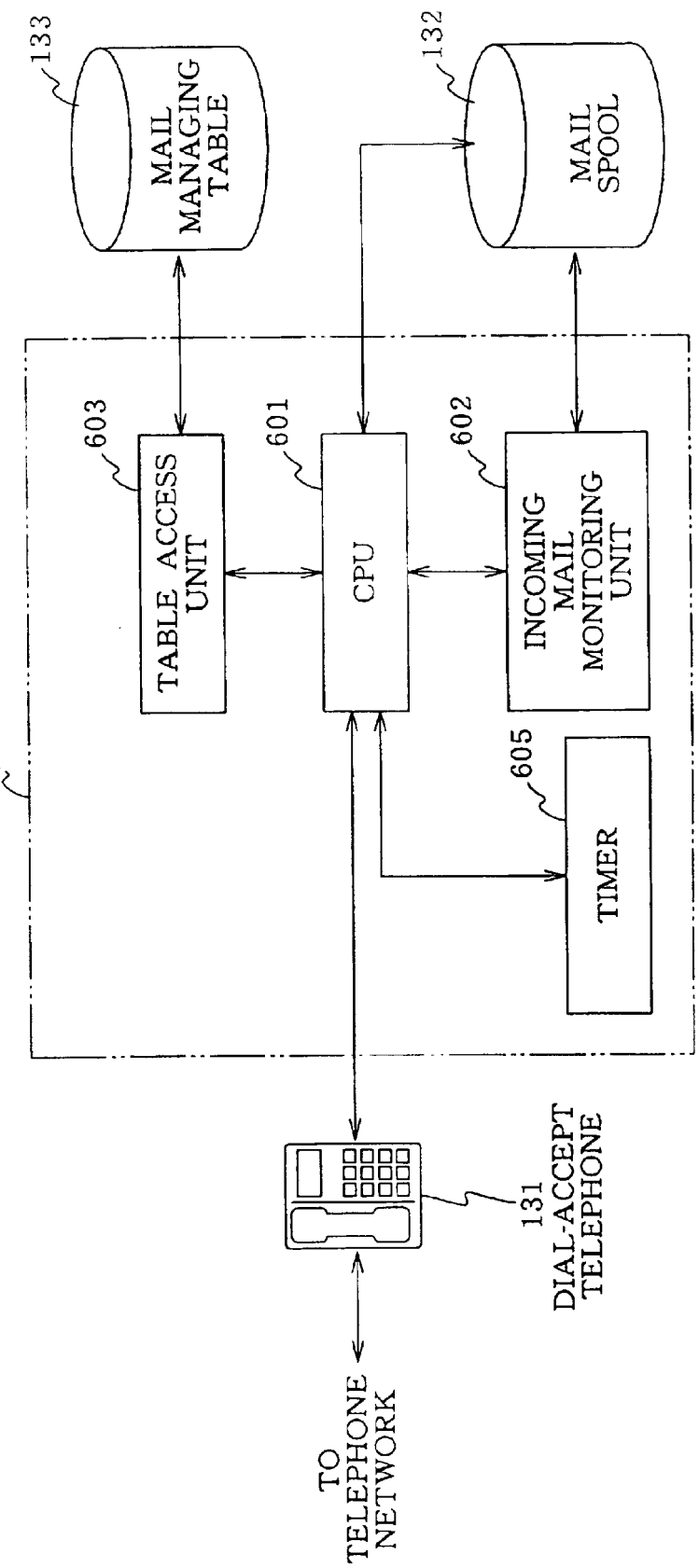
FIG. 6 shows a configuration of a server in the system based on the incoming mail check method using the dial time.

FIG. 6 shows a configuration of the server 130 in the system based on the incoming mail check method using the dial time. Referring to FIG. 6, the server 130 includes a CPU 601, an incoming mail monitoring unit 602, a table access unit 603, and a timer 605. The components 601 to 603 have identical configurations as the components 301 to 303 in the first embodiment and their explanations are omitted. The timer 605 is used by the server to count the dial time, processing time, wait time, and the like.

Next, explanation will be given on the operation (incoming mail check method) in the e-mail system according to the present embodiment. This embodiment is also based on the aforementioned three assumptions.

Firstly, it is assumed that the user who wants to check whether an incoming mail is present in the server 130 has loaded the telephone number of the client 110 and the mail user ID information in the server 130. Secondly, it is assumed that the processing by the CPU 501 is designed so that the mail managing table 133 is constantly updated in such a manner that a record of a client 110 having a higher incoming mail check frequency is positioned at a higher line (i.e., data storage area near the first address accessed by the CPU 301) and a record of a client 110 having a lower incoming mail check frequency is positioned at a lower line in the table, so that the average access time by the CPU 501 is reduced, i.e., a necessary record is accessed by the CPU 501 at a higher speed. Thirdly, it is assumed that before dialing to the server 130, the user of the client 110 selects a service request to the server 130.

In addition to the above three assumptions, fourthly, it is assumed that the system is designed so that when the client 110 dials to the server 130 so as to check whether an incoming mail is present in the server 130, the client 110 can know whether an incoming mail addressed to the client 110 is present in the server 130 depending on whether a dial response is made from the server within a predetermined period of time (for example, 15 seconds). The predetermined period of time, which is referred to as the dial time, is decided in advance between the client 110 and the server 130.

Next, explanation will be given on the operation of the present embodiment with reference to the system configuration in FIG. 1, the configuration of the client 110 in FIG. 5, the configuration of the server 130 in FIG. 6, the flowchart in FIG. 7, and the mail managing table 133 in Table 1.

Firstly, explanation will be given on the operation of the client 110. FIG. 7 is a flowchart of the system based on the incoming mail check method using the dial time. The operation performed by the client 110 when checking whether an incoming mail addressed to the client 110 is present is identical to the operation of the client 110 in the first embodiment except for that in step C202, the dial time is counted by the timer 605 until the client 110 receives a dial response from the server 130.

Figure 7:
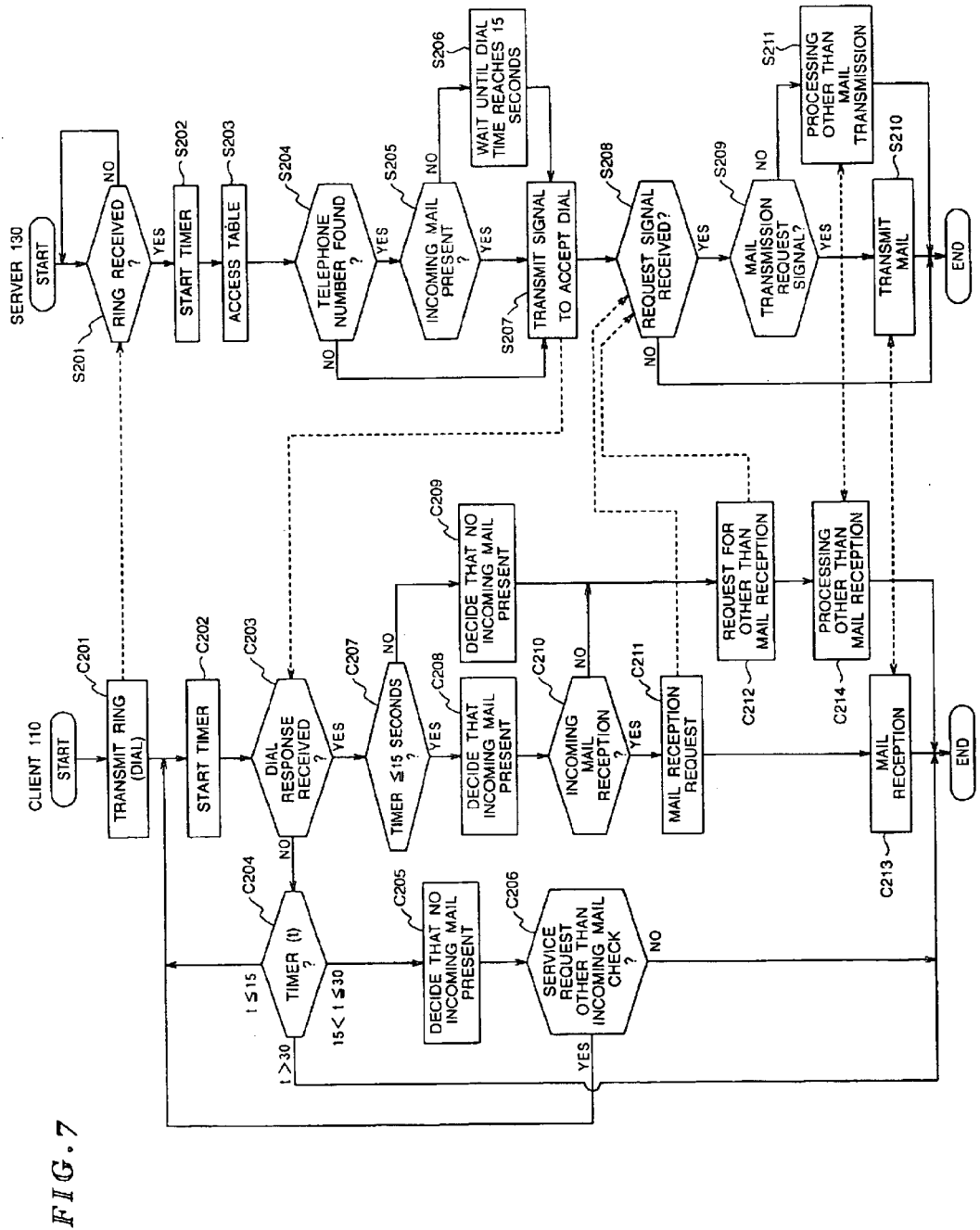
FIG. 7 is a flowchart of the system based on the incoming mail check method using the dial time.

Next, the client 110 determines via the dial-up telephone 111 whether a dial response is received (step C203 in FIG. 7). If no dial response is received, the dial time at that stage is determined (step C204). If no dial response is received after the dial time exceeds 15 seconds, the client 110 decides by the dial response decision unit 505 that no incoming mail is present in the server 130 (step C205). At this stage, the client 110 is not connected to the server 130 but can know that no incoming mail addressed to the client 110 is present in the server 130. The client 110 transmits this incoming mail check result to the display unit 503 for the user.

On the other hand, in step C203, if the client 110 receives a dial response, the client 110 firstly references the dial time at the point when the dial response is received to determine whether the dial time does not exceed 15 seconds (step C207). If the dial time does not exceed 15 seconds, the client 110 decides that an incoming mail addressed to the client 110 is present in the server 130 (step C208). On the other hand, if the dial time at the point when the dial response is received does exceed 15 seconds, the client 110 decides that no incoming mail addressed to the client 110 is present in the server 130 (step C209).

Next, explanation will be given on the operation of the server 130. In this embodiment, the processing performed by the server 130 when receiving the ring for the incoming mail check from the client 110 is identical to the operation of the server in the first embodiment except for that in step S205, if it is determined that no incoming mail addressed to the client 110 is present, the server 130 waits until the dial time reaches 15 seconds (step S206) and transmits a control signal to the dial window telephone 131 so as to receive the dial (step S207).

Next, explanation will be given on a specific example of the incoming mail check operation performed when no incoming mail is present. In this embodiment, the incoming mail check operation when no incoming mail is present is identical to that of the first embodiment except for that in step S205 it is determined that no incoming mail is present and the server 130 waits until the dial time reaches 15 seconds. When the dial time exceeds 15 seconds, the server 130 transmits a control signal to the dial-accept telephone 131 so as to accept the dial (step S207).

Next, explanation will be give on a specific example of the incoming mail check operation performed when an incoming mail is present. In this embodiment, the incoming mail check operation when an incoming mail is present is identical to that of the first embodiment.

[Embodiment 3]

Description will now be directed to a third embodiment of the present invention with reference to the attached drawings. It should be noted that like components as in the first and the second embodiments are denoted by like reference symbols and their explanations are omitted.

Figure 8:
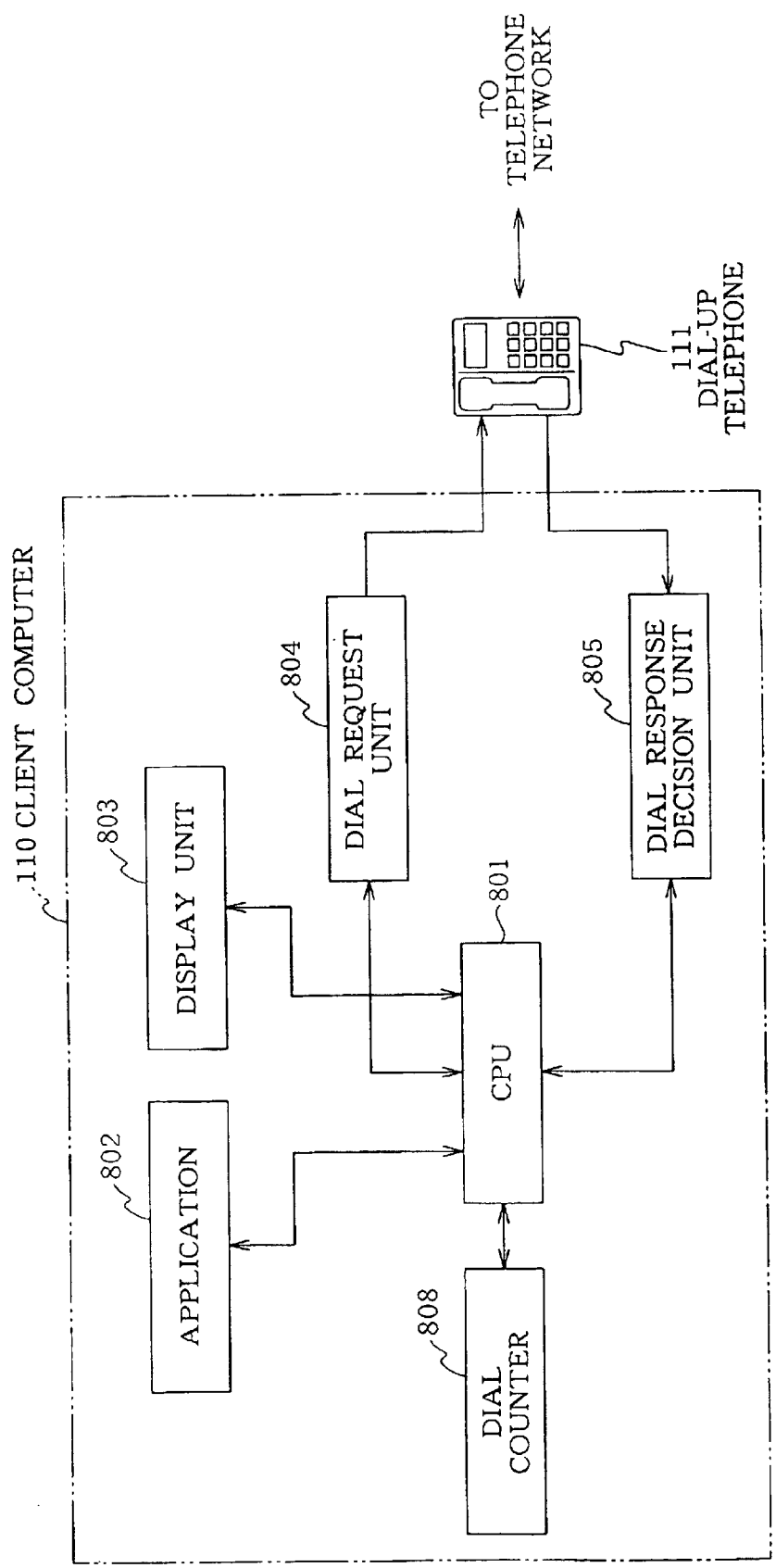
FIG. 8 shows a configuration of a client in a system based on the incoming mail check method using the dial count.

FIG. 8 shows a configuration of the client 110 in the system based on the incoming mail check method using the dial count.

Referring to FIG. 8, the client 110 includes a CPU 801, an application 802, a display unit 803, a dial request unit 804, a dial response decision unit 805, and a dial counter 808. These components have identical configurations as the corresponding components in the first embodiment (201 to 205) except for the dial counter 808 which counts the number of times dialing is performed by the client 110 to another computer (not depicted) until the dialing is accepted.

Figure 9:
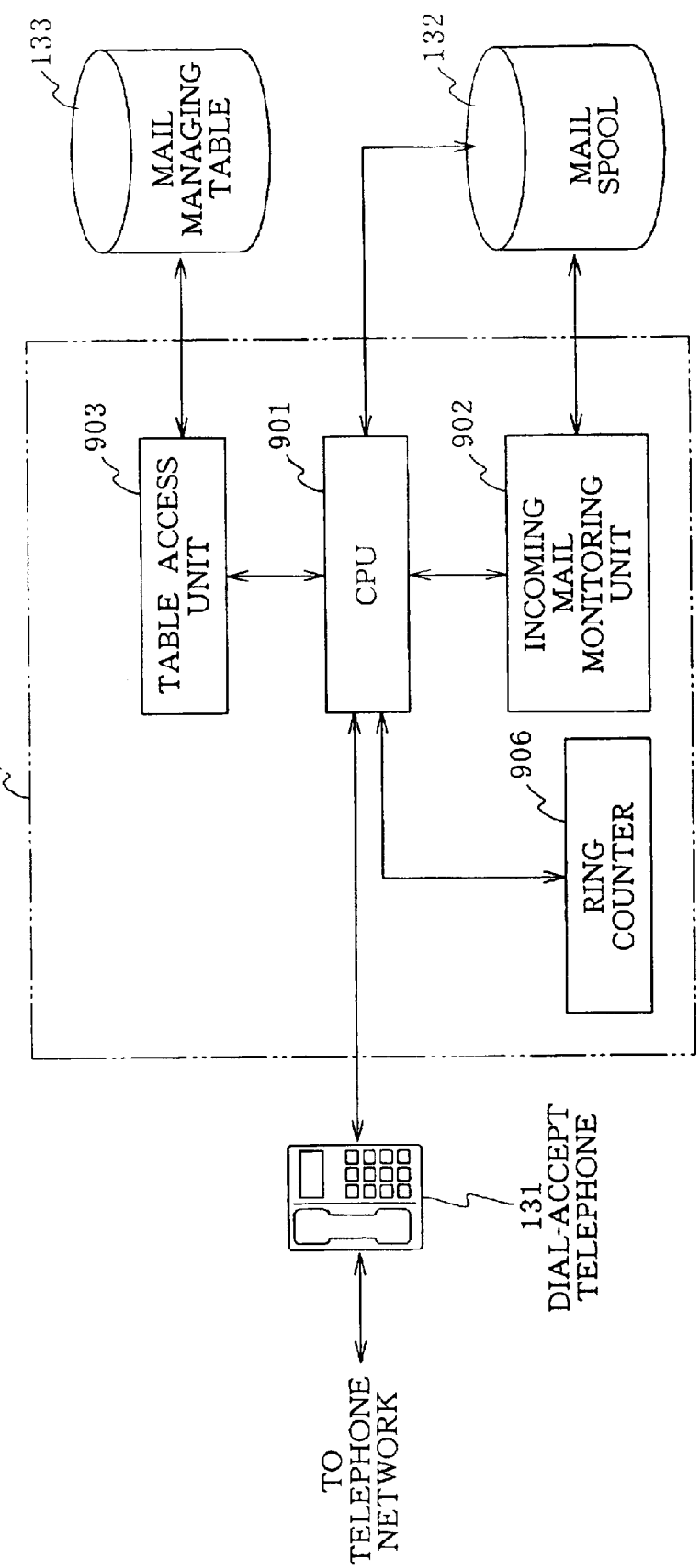
FIG. 9 shows a configuration of a server in the system based on the incoming mail check method using the dial count.

FIG. 9 shows a configuration of the server 130 in the system based on the incoming mail check method using the dial count. Referring to FIG. 9, the server 130 includes a CPU 901, an incoming mail monitoring unit 902, a table access unit 903, and a dial counter 906.

These components 901 to 903 have configurations identical to the corresponding components (301 to 303) in the first embodiment except for the dial counter 906 which counts the number of times dialing is successively performed by the client 110 to the server 130 until the dial is accepted. If one dialing is not followed by dialing performed by the same client 110 within a predetermined period of time (for example, 30 seconds), the dialing operation by the client 110 is decided to have ended and the dial counter is reset.

Next, explanation will be given on the e-mail system operation (incoming e-mail check method) according to the present embodiment. The present embodiment is also based on the aforementioned three assumptions. Moreover, the present embodiment is based on the fourth assumption that when the client 110 dials to the server 130 to check whether an incoming mail is present in the server 130, the client 110 makes a predetermined ring count (for example, 3 times) and repeats the ring a predetermined number of times (for example, 3 times) so as to decide according to a dial response whether an incoming mail is present. The predetermined ring count and the predetermined dial count are decided in advance between the client 110 and the server 130.

Next, explanation will be given on the operation of the present embodiment with reference to the system configuration in FIG. 1, the configuration of the client 110 in FIG. 8, the configuration of the server 130 in FIG. 9, the flowchart in FIG. 10, and the mail managing table 133 in Table 1.

Firstly, explanation will be given on the operation of the client 110. FIG. 10 is a flowchart of the system based on the incoming mail check method using the dial count.

Figure 10:
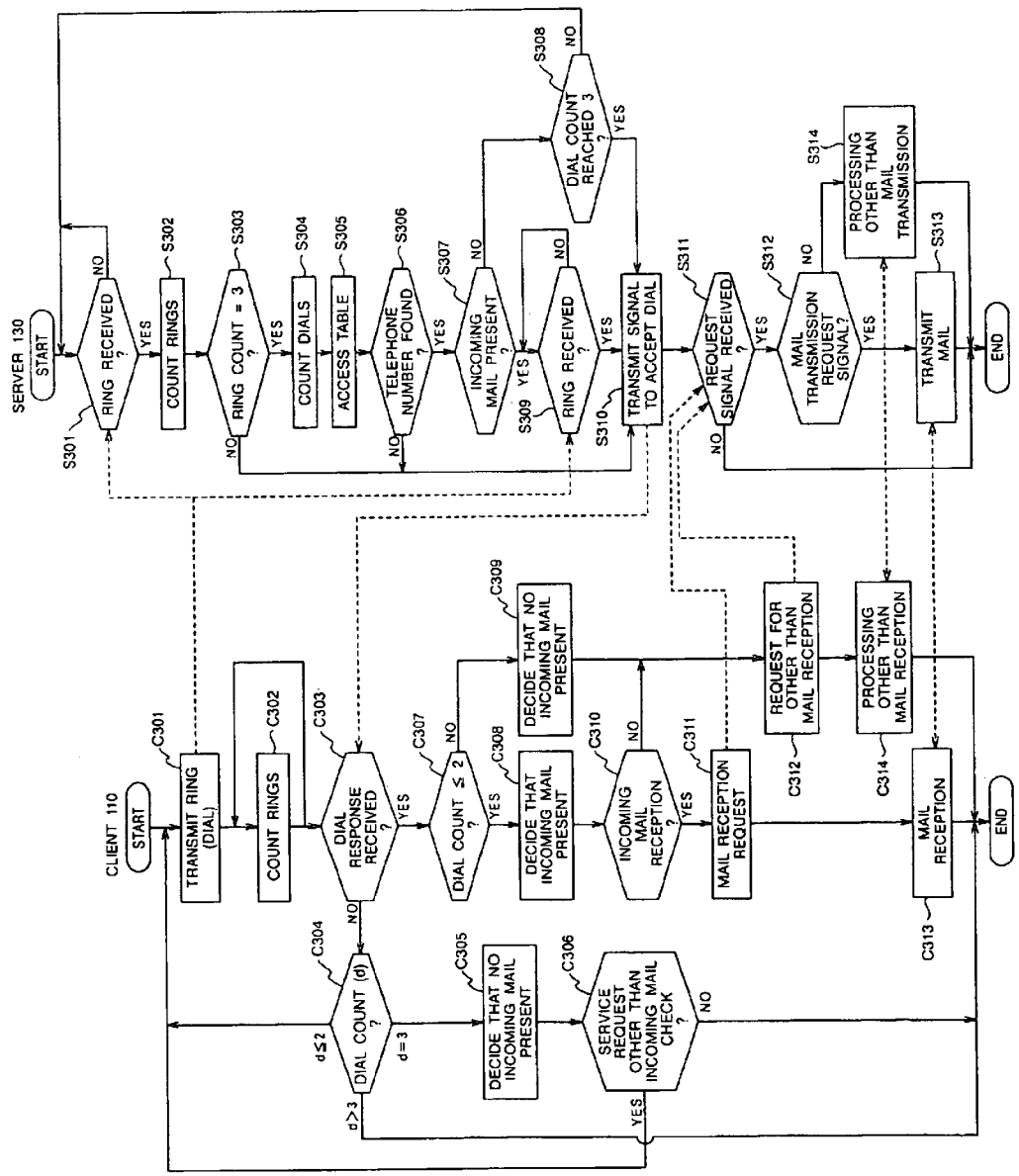
FIG. 10 is a flowchart of the system based on the incoming mail check method using the dial count.

Referring to FIG. 10, the processing performed when the client 110 checks whether an incoming mail addressed to the client 110 is present in the server 130 is identical to the operation of the client in the first embodiment except for step C302 which counts the number of times dialing is performed until the client 110 receives a dial response from the server 130.

Next, the client 110 checks via the dial-up telephone 111 whether a dial response is received (step C303 in FIG. 10). When no dial response is received, the dial count is decided at that stage (step C304). If no dial response is received when the dial count reaches 3, the client decides through the dial response decision unit 805 that no incoming mail addressed to the client 110 is present in the server 130 (step C305). At this stage, the client 110 remains unconnected to the server 130 but the client 110 can know that no incoming mail addressed to the client 110 is present in the server 130. The client 110 transmits this incoming mail check result to the display unit 803 for the user.

On the other hand, if the client 110 receives a dial response in step C303, the dial client 110 firstly references the dial count when the dial response is received and decides whether the dial count is 2 or below (step C307). If the dial count when the dial response is received is 2 or below, the client 110 decides that an incoming mail addressed to the client 110 is present in the server 130 (step C308). On the other hand, if the dial count at the moment when the dial response is received exceeds 2, the client decides that no incoming mail addressed to the client 110 is present in the server 130 (step C309).

Next, explanation will be given on the operation of the server 130. In this embodiment, the processing performed when the server 130 receives a ring from the client 110 to check whether an incoming mail is present is identical to the operation of the server 130 in the first embodiment except for that in step S303, the ring count is checked whether it is 3. If the ring count is 3, the server 130 decides that the client 110 has made an incoming mail check request and counts the number of times dialing has been made (step C304).

Moreover, if in S307 it is decided that no incoming mail addressed to the client 110 is present, the server 130 checks whether the dial count has reached 3 (step S308). If the dial count is 3, the server 130 transmits a control signal to the dial-accept telephone 131 so as to accept the dial (step S309).

Next, explanation will be given on a specific example of the incoming mail check operation when no incoming mail is present. The operation is identical to the incoming mail check operation in the first embodiment except for that in step C302 of FIG. 10, the number of times dial is made is counted until the client 110 receives a dial response from the server 130. Moreover, step S304 counts the dial is made until the server 130 transmits a dial response to the client 110. Furthermore, in step S307, if it is decided that no incoming mail is present, the server 130 checks whether the dial count has reached 3. If the dial count is 3 or more, the server 130 transmits a control signal to the dial-accept telephone 131 so as to accept the dial (step S310).

Next, explanation will be given on a specific example of the incoming mail check operation performed when an incoming mail is present. The operation is identical to the incoming mail check operation performed in the first embodiment when an incoming mail is present except for that step C302 counts the number of times dial has been made until the client 110 receives a dial response from the server 130. Moreover, step S304 counts the number of times dial has been made until the server 130 transmits a dial response to the client 110.

[Embodiment 4]

Description will now be directed to the fourth embodiment of the present invention with reference to the attached drawings. It should be noted that like components as in the aforementioned embodiments are denoted by like reference symbols and their explanations are omitted.

Figure 11:
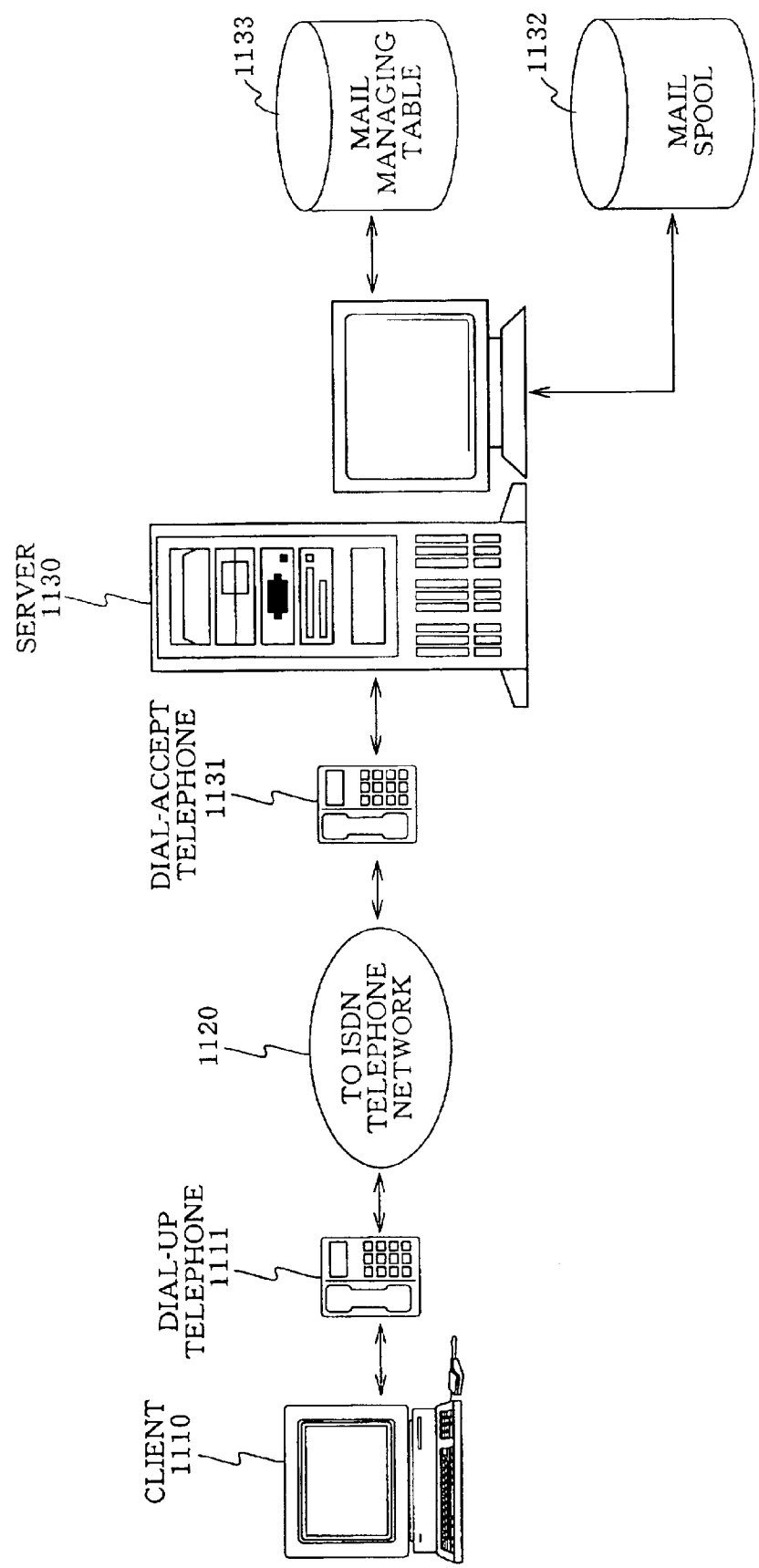
FIG. 11 shows a configuration of a system based on an incoming mail check method using an ISDN sub-address.

FIG. 11 shows a configuration of a system based on the incoming mail check method using an ISDN sub-address according to the present invention.

Referring to FIG. 11, the e-mail system based on the incoming e-mail check method according to the present embodiment includes a client computer (hereinafter, referred to simply as a client) 1110, a dial-up telephone 1111 of the client 1110, an ISDN telephone network 1120, a server computer (hereinafter, referred to simply as a server) 1130 operating according to a program control, a dial-accept telephone 1131 of the server 1130, a mail spool 1132, and a mail managing table 1133.

Figure 12:
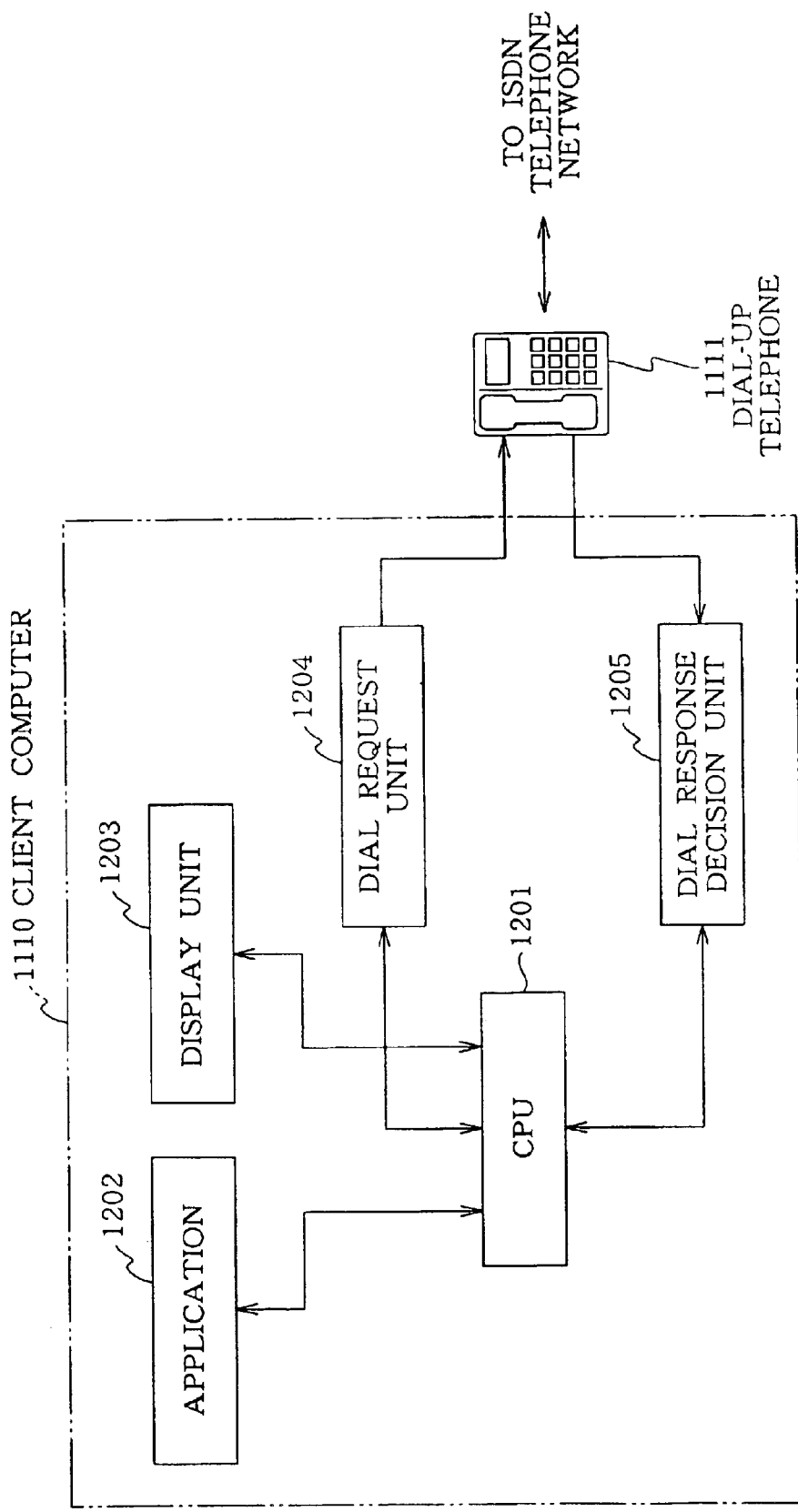
FIG. 12 shows a configuration of a client in the system based on the incoming mail check method using the ISDN sub-address.

FIG. 12 shows a configuration of the client 1110 in the system based on the incoming mail check method using the ISDN sub-address. Referring to FIG. 12, the client 1110 includes a CPU 1201, an application 1202, a display unit 1203, a dial request unit 1204, and a dial response decision unit 1205. These components (1201 to 1205) have identical configurations as the corresponding components of the first embodiment (201 to 205) and their explanations are omitted.

Figure 13:
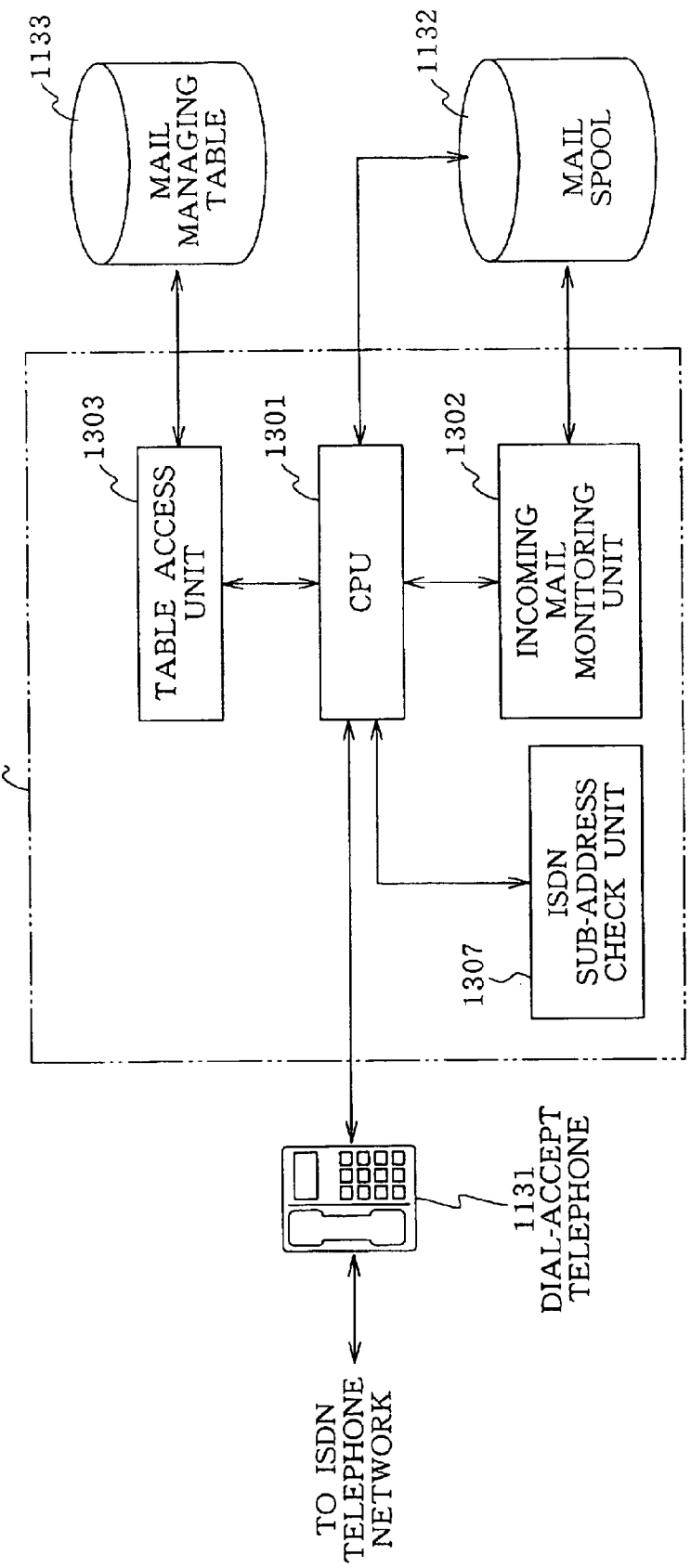
FIG. 13 shows a configuration of a server in the system based on the incoming mail check method using the ISDN sub-address.

FIG. 13 shows a configuration of the server 1130 in the system based on the incoming mail check method using the ISDN sub-address which will be detailed below. Referring to FIG. 13, the server computer 1130 includes a CPU 1301, an incoming mail monitoring unit 1302, a table access unit 1303, and an ISDN sub-address check unit 1307. These components (1301 to 1303) have identical configurations as the components (301 to 303) in the first embodiment excluding the ISDN sub-address check unit 1307.

The ISDN sub-address check unit 1307 is used to check whether a data of an ISDN sub-address is contained after a number transmitted from the client 1110 to the server 1130. The ISDN sub-address is a function to add a symbol and data after a communication number of a local station when it is transmitted from a communication apparatus to another communication apparatus via the ISDN telephone network 1120.

Next, explanation will be given on the operation of the e-mail system (incoming mail check method) according to the present embodiment. The present embodiment is based on the aforementioned first and the second assumptions.

Moreover, the user of the client 1110, before dialing to the server 1130, selects a serve request to the server 1130. When the user has selected the incoming mail check service and confirmed that no incoming mail is present, the user can change the request, i.e., can request a service other than the incoming mail check. This is the third assumption of the fourth embodiment.

Moreover, the present embodiment is based on a fourth assumption that the client 1110 is connected to the server 1130 by the ISDN telephone network 1120.

Furthermore, the present embodiment is based on a fifth assumption that the server can identify the service request from the client 1110 using the ISDN sub-address added after the telephone number transmitted from the client 1110. For example, if the telephone number is added by "*1", the number "1" indicates the "incoming mail check request". Similarly, number "2" indicates an "e-mail transmission/reception request", and number "3" indicates an "on-internet file transfer request".

Figure 14:
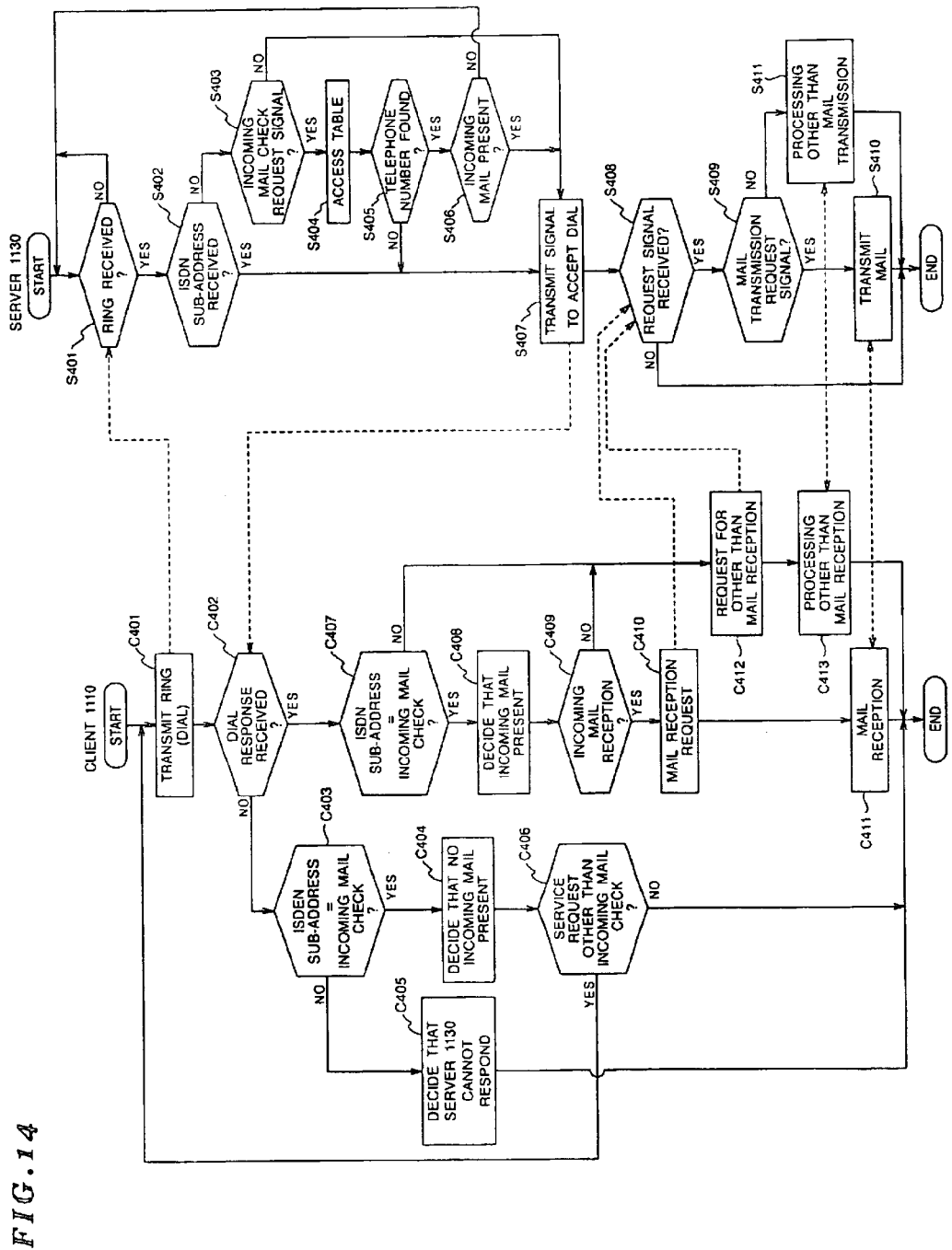
FIG. 14 is a flowchart of the system based on the incoming mail check method using the ISDN sub-address.

Next operation of the present embodiment will be detailed with reference to the system configuration in FIG. 11 the configuration of the client 1110 in FIG. 12, the configuration of the server 1130 in FIG. 13, the flowchart in FIG. 14, and the mail managing table 1133 in Table 1. Firstly, explanation will be given on the operation of the client 1110. FIG. 14 is a flowchart of the system based on the incoming mail check method using the ISDN sub-address.

Referring to FIG. 11 and FIG. 14, when the client 1110 requests a service to the server 1130 using the ISDN sub-address, the client 1110 sends the telephone number of the server 1130 to the dial-up telephone 1111 and the dial-up telephone 1111 dials via the ISDN telephone network 1120 to the dial-accept telephone 1131 of the server 1130. When the client 1110 dials (transmits a ring) (step C401 in FIG. 14), it is assumed that the client 1110 adds a service identification number after the telephone number using the ISDN sub-address function, so that the server 1130 can identify the service type requested by the client 1110.

Next, the client 1110 checks via the dial-up telephone 1111 whether a dial response is received (step C402). If no dial response is received, the client 1110 checks the data of the ISDN sub-address which has been transmitted. If the data of the ISDN sub-address is the incoming mail check request and no dial response is received, the client 1110 decides that no incoming mail addressed to the client 1110 is present in the server 1130 (step C404). At this stage, the client 1110 remains unconnected to the server 1130 but can know that no incoming mail addressed to the client 1110 is present in the server 1130. Next, the client 1110 checks whether a service other than the incoming mail check service has been requested to the server 1130 (step C406). Here, the CPU 1201, via a display unit 1203 serving also as an input unit, checks whether a service other than the incoming mail check service has been requested. When the user requests a service other than the incoming mail check service, for example, the user enters a service number into the system of the client 1110. When a service other than the incoming mail check service is requested, the client 1110 re-dials (return to step C401). If no request is entered by the user within a predetermined period of time (for example, 30 seconds), the client 1110 decides that no service other than the incoming mail check service is requested and terminates the operation. On the other hand, in step C403, if the ISDN sub-address data indicates a service other than the incoming mail check service and no dial response is received, then the client 1110, via the dial response decision unit 1205, decides that the server 1130 cannot respond (step C405) and the client 1110 terminates the operation.

On the other hand, in step C402, if the client 1110 receives a dial response from the server 1130, then the client 1110 firstly identifies the ISDN sub-address data transmitted at dialing to the server 1130 (step C407). If the request signal is the incoming mail check request signal, the client 1110 decides that an incoming mail addressed to the client 1110 is present in the server 1130 (step C408) and decides whether to receive the incoming mail (step C409). When receiving the incoming mail, the client 1110 transmits a mail reception request signal to the server 1130 (step C410) and performs a mail reception service processing (step C411). If the request signal is other than the mail transmission request signal, the client 1110 performs a service requested (step C413).

Next, explanation will be given on the operation of the server 1130. The processing performed when a new mail addressed to a particular user in the server 1130 is identical as in the first embodiment. Next, when the server 1130 receives a dial signal from the client 1110 (step S401), the server 1130 firstly activates the ISDN sub-address check unit 1307 to check whether an ISDN sub-address data is added after the telephone number transmitted from the client 1110 (step S402). If an ISDN sub-address data is present, the server 1130 checks the data of the ISDN sub-address (step S403). If this is other than the incoming mail check request signal, the server 1130 transmits a control signal to the dial-accept telephone 1131 so as to accept the dial (step S407). When the dial is accepted, a connection is established between the client 1110 and the server 1130 and it becomes possible to perform a mail transmission/reception processing and an on-internet file transfer processing. Lastly, the server 1130 checks the request signal from the client 1110 (step S408). If this request signal is a mail transmission request signal (step S409), the server 1130 performs a mail transmission service processing (step S410). If the request signal is other than the mail transmission request signal, the server 1130 performs a service processing requested (step S411).

On the other hand, if the server 1130 receives a data of the ISDN sub-address in step S402 and the ISDN sub-address data is identified as an incoming mail check request signal in step S403, the server 1130 firstly accesses the mail managing table 1133 (S404) and checks whether the telephone number of the client 1110 is present in the mail managing table 1133 (step S405). Unless the telephone number of the client 1110 is found, the server 1130 decides that the client 1110 cannot receive the incoming mail check service at the dial stage and transmits a control signal to the dial-accept telephone 1131 so as to unconditionally accept the dial (step S407). On the other hand, if the telephone number of the client 1110 is found, the server 1130 checks whether an incoming mail addressed to the client 1110 is present (step S406). If an incoming mail addressed to the client 1110 is present, the server 1130 transmits a control signal to the dial-accept telephone so as to accept the dial (step S407). On the other hand, if no incoming mail addressed to the client 1110 is present, the server 1130 returns to step S401 without accepting the dial.

Lastly, when the server 1130 accepts the dial of the client 1110, a connection is established between the client 1110 and the server 1130 and client 1110 can perform a mail transmission/reception request and an on-internet file transfer request to the server 1130. When the server receives a request signal from the client 1110, the server performs the service requested. That is, when the server 1130 receives a request signal from the client 1110 (step S408), the server checks whether the signal received is an incoming mail transmission request signal (step S409). If the signal is a mail transmission request signal, the server 1130 performs a mail transmission service (step S410). If the signal is other than the mail transmission request signal, the server 1130 performs a service requested (step S411). On the other hand, if no request signal from the client 1110 is present, the server 1130 terminates the processing.

Next, explanation will be given on a specific example of the incoming mail check operation performed when no incoming mail is present. In this embodiment, for example, as shown in Table 1, it is assumed that an incoming mail has been downloaded and no incoming load is currently present for User01. In this state, User01 checks via the client 1110 using the ISDN sub-address function whether an incoming mail is present. For example, if the telephone number of the client 1110 of User01 is 03-1111-1111, the client 1110 transmits as the telephone number of an ISDN sub-address data, 03-1111-1111*1, wherein "1" represents an incoming mail check request.

Upon reception of a ring from the client 1110 of User01 (step S401), the server 1130 firstly activates the ISDN sub-address check unit 1307 to check whether the telephone number transmitted from the client 1110 is followed by an ISDN sub-address data (step S402). Since the ISDN sub-address data is "1" which indicates an incoming mail check request signal, the server 1130 accesses the mail managing table 1133 (step S404) and checks whether the telephone number of the client 1110 who is now dialing is present in the table 1133. If the server 1130 can find the telephone number of the client 1110 "03-1111-1111", the server 1130 checks whether an incoming mail addressed to User01 is present (step S406). As shown in Table 1, since flag "0" is set to the incoming mail check column of User01, the server 1130 decides that no incoming mail addressed to the client 1110 is present and returns to step S401 without accepting the dial. At this stage, the client 1110 remains unconnected to the server 1130 but can know that no incoming mail addressed to the client 1110 is present in the server 1130. The client 1110 transmits this incoming mail check result to the display unit 1203 for the user. Subsequently, the client 1110 checks whether a request other than the incoming mail check has been made from the user to the server 1130 (step C406). If no request other than the incoming mail check has been made to the server 1130, the client 1110 terminates the dialing. If a request other than the incoming mail check has been made from the user to the server 1130, the client 1110 re-dials (return to step C401).

Next, explanation will be given on a specific example of the incoming mail check operation performed when an incoming mail is present. For example, User02 uses the client 1110 and dials to check whether an incoming mail is present in the server 1130 (step C401 in FIG. 14). When dialing, the client 1110 uses the ISDN sub-address function after the telephone number of the client 1110, i.e., adds "1" indicting "incoming mail transmission request" to be transmitted to the server 1130. For example, in this embodiment, since the telephone number of the client 1110 is 03-2222-2222, the client 1110 transmits as the telephone number and the sub-address information "03-2222-2222*1" to the server 1130.

Next, when the server 1130 receives the dial request from the User02 client 1110 (step S401), the server 1130 firstly checks whether an ISDN sub-address data is present after the telephone number transmitted from the client 1110 (step S402). Since the ISDN sub-address data "1" is present, the server 1130 checks whether the ISDN sub-address data is an incoming mail check request signal (step S403). Since "1" is an incoming mail check request signal, the server 1130 accesses the mail managing table 1133 (step S404) and checks whether the telephone number of the client 1110 is present in the mail managing table 1133 (step S405). If the telephone number of the client 1110 "03-2222-2222" is found, the server 1130 checks whether an incoming mail addressed to the client 1110 is present (step S406). As shown in Table 1, an incoming mail addressed to the client 1110 is present and the server 1130 transmits a control signal to the dial-accept telephone 1131 so as to accept the dial (step S407). When the dial is accepted, a connection is established between the client 1110 and the server 1130.

Lastly, the server 1130 accepts the dial of the client 1110 and a connection is established between the client 1110 and the server 1130. The client 1110 can perform a mail transmission/reception request processing and an on-internet file transfer request processing to the server 1130. That is, when the server 1130 accepts the request signal from the client 1110 (step S408), the service requested is performed. If the request signal from the client 1110 is a mail transmission request signal, the server 1130 performs a mail transmission service processing (step S410). On the other hand, if the request signal is other than the mail transmission request signal, the server 1130 performs a service requested (step S411). If no request signal from the client 1110 is present, the server 1130 terminates the processing.

Next, explanation will be given on a specific example of the operation performed when the client 1110 requests a service other than the incoming mail check without performing the incoming mail check. In this embodiment, for example, User02 uses the client 1110 and dials to the server 1130 to request an on-internet file transfer without performing the incoming mail check (step C401). When dialing, the client 1110 adds "3" indicating an "on-internet file transfer request" after the telephone number to be transmitted to the server 1130. For example, in this embodiment, the telephone number of the client 1110 is 03-2222-2222 and the client 1110 transmits "03-2222-2222*3" as the telephone number and the sub-address.

Next, the server 1130 receives the dial request from the client 1110 (step S401) and checks whether an ISDN sub-address information is present after the telephone number transmitted from the client 1110 (step S402). In this case, the ISDN sub-address data is "3" and the server 1130 checks whether the ISDN sub-address data is an incoming mail check request signal in step S403. Since "3" is not the incoming mail check request signal, the server 1130 transmits a control signal to the dial-accept telephone 1131 so as to accept the dial (step S407). When the dial is accepted, a connection is established between the client 1110 and the server 1130.

Lastly, after the connection is established between the client 1110 and the server 1130, the server 1130 identifies the request signal from the client 1110 (step S408). If the request signal is an "on-internet file transfer request" (Yes in step S409), the server 1130 performs the "on-internet file transfer" service processing (step S411).

[Embodiment 5]

Description will now be directed to a fifth embodiment of the present invention with reference to the attached drawings. It should be noted that like components as those explained in the aforementioned embodiments are denoted by like reference symbols and their explanations are omitted.

Figure 15:
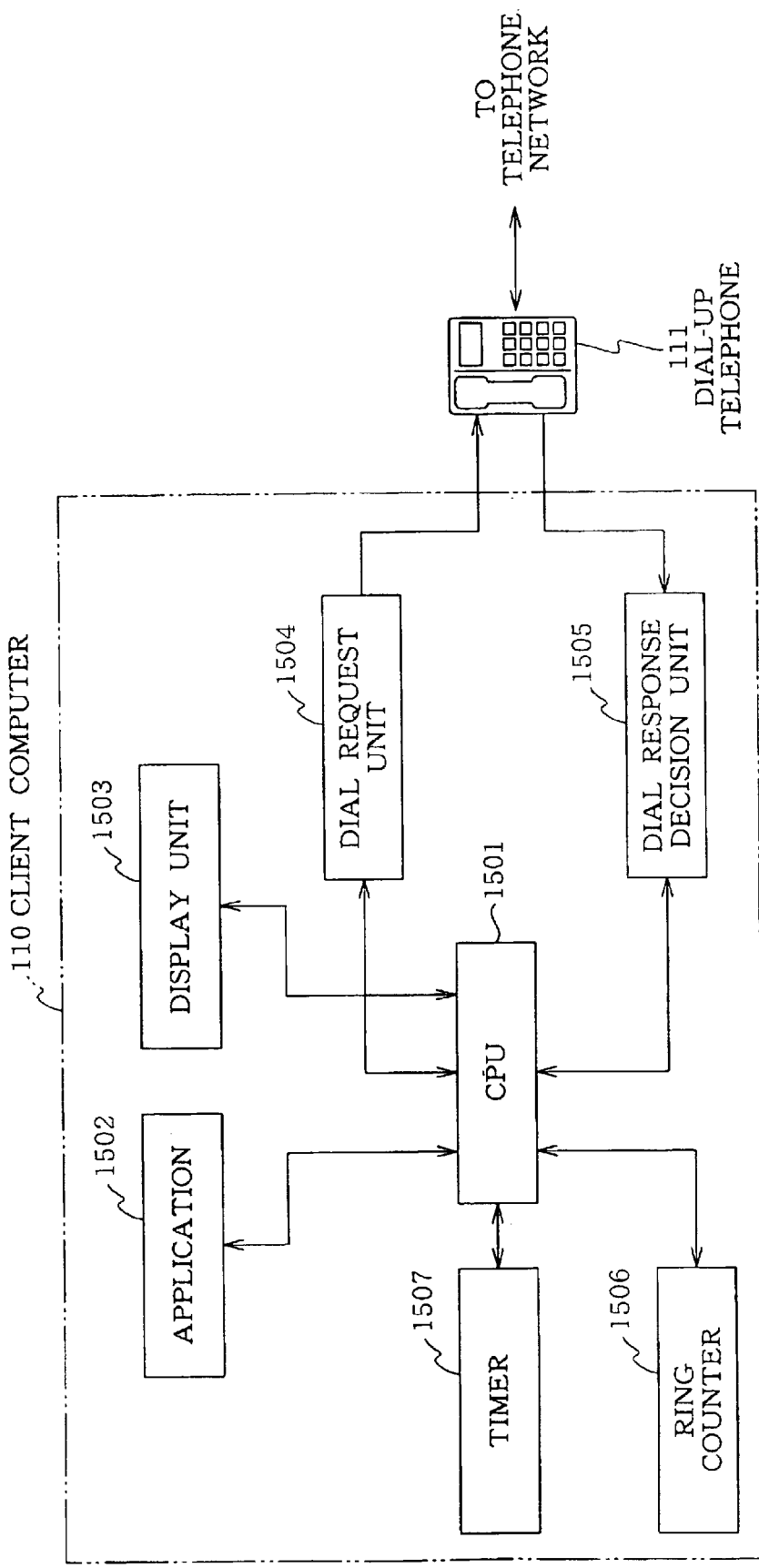
FIG. 15 shows a configuration of a client in the system based on the incoming mail check method using the ring count and the dial time.

FIG. 15 shows a configuration of the client 110 in the incoming mail check method using the ring count and the dial time.

Referring to FIG. 15, the client 110 includes a CPU 1501, an application 1502, a display unit 1503, a dial request unit 1504, a dial response decision unit 1505, a ring counter 1506, and a timer 1507. These components are have identical configurations as the corresponding components (201 to 206) in the first embodiment, except for the timer 1501 which has a configuration identical to 507 of FIG. 5 in the second embodiment.

Figure 16:
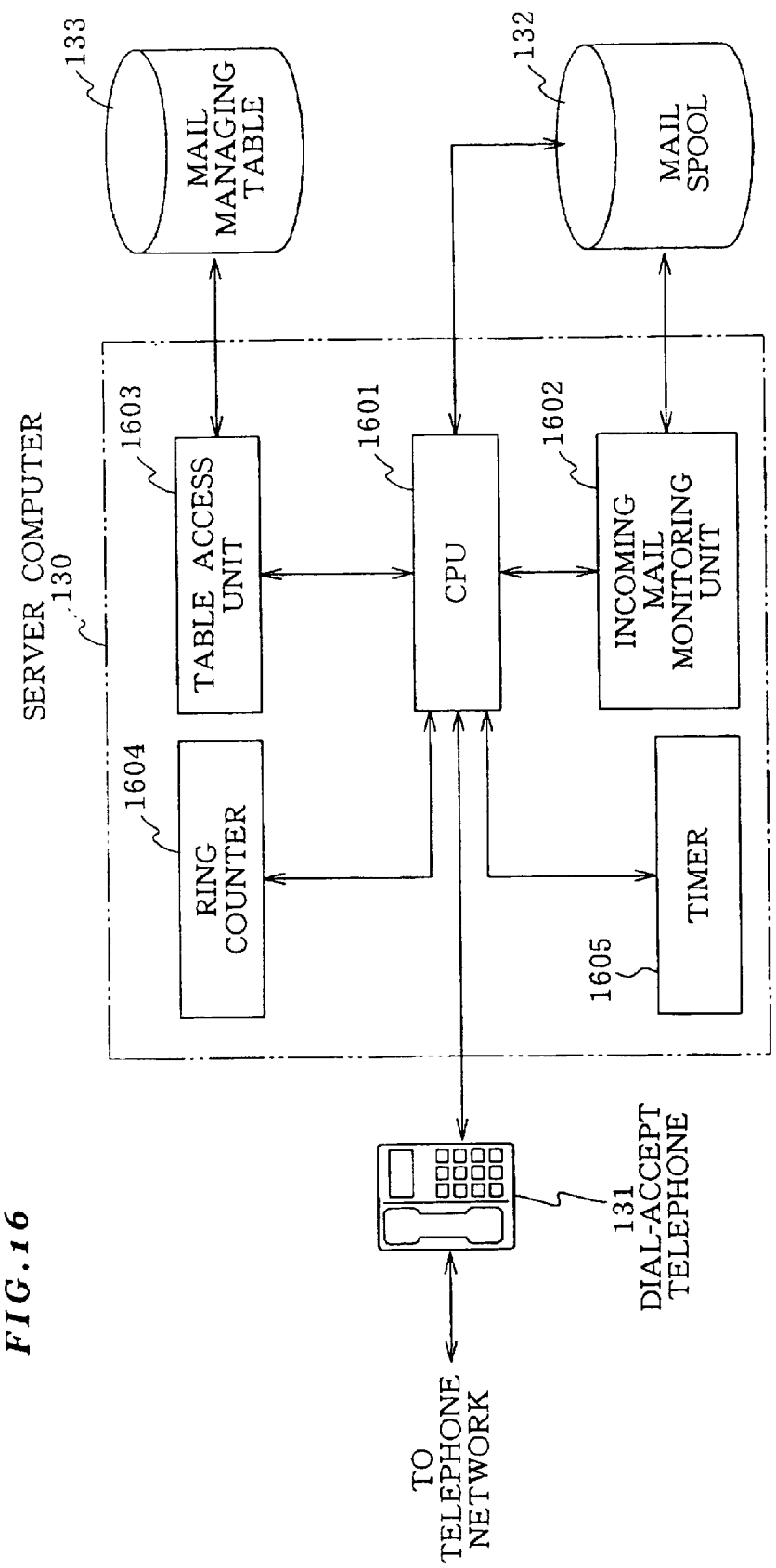
FIG. 16 shows a configuration of a server in the system based on the incoming mail check method using the ring count and the dial time.

FIG. 16 shows a configuration of the server 130 of the system based on the incoming mail check method using the ring count and the dial time. Referring to FIG. 16, the server 130 includes a CPU 1601, an incoming mail monitoring unit 1602, a table access unit 1603, a ring counter 1604, and a timer 1605.

These components have identical configurations as the corresponding components (301 to 304) in FIG. 3 of the first embodiment, excluding the timer 1605 which has a configuration identical to 605 of FIG. 6 of the second embodiment.

Next, explanation will be given on the operation of the e-mail system (incoming e-mail check method) according to the present embodiment. This embodiment is based on the first to the third assumptions described in the first embodiment.

The present embodiment is also based on a fourth embodiment as follows. When the client 110 dials to the server 130 to check whether an incoming mail is present in the server 130, a dial response may be or may not be transmitted from the server 130 within a predetermined dial time (for example, 15 seconds) or within a predetermined ring count (for example, 5 times), so that the client 110 can know whether an incoming mail addressed to the client 110 is present in the server 130. The predetermined dial time and the ring count for waiting the dial response can be decided in advance between the client 110 and the server 130.

Figure 17:
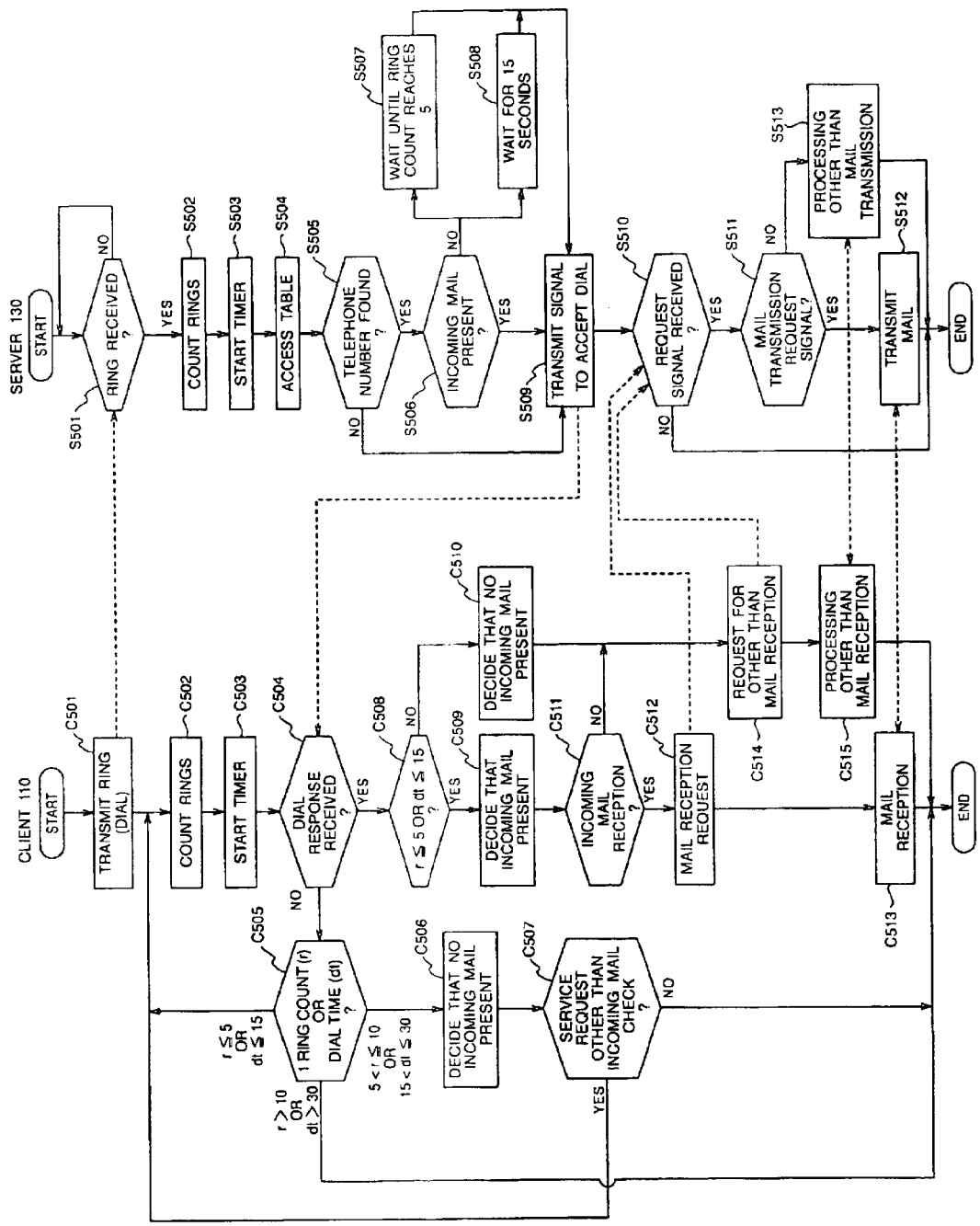
FIG. 17 is a flowchart of the system based on the incoming mail check method using the ring count and the dial time.

Next, an explanation will be given on the operation of the present embodiment with reference to the configuration of the client 110 in FIG. 15, the configuration of the server 130 in FIG. 16, the flowchart in FIG. 17, and the mail managing table 1133 in Table 1. In this embodiment, firstly, explanation will be given on the operation of the client 110. FIG. 17 is a flowchart of the system based on the incoming mail check method using the ring count and the dial time.

The processing performed when the client 110 checks whether an incoming mail addressed to the client 110 is present in the server 130 is identical to that of the first embodiment except for that in step C502 and step C503, the client 110 counts the rings and calculates the time by the timer 605 until a dial response is received from the server 130.

Next, in step C504, the client 110 checks whether a dial response is received via the dial-up telephone 111. If no dial response has been received, the client checks the ring count and the dial time at this stage (step C505 in FIG. 17). If no dial response is received after the ring count exceeds 5 or the dial time exceeds 15 seconds, the client 110 decides by the dial response decision unit 1505 that no incoming mail is present in the server 130 (step C506). At this stage, the client 110 remains unconnected to the server 130 but can know that no incoming mail addressed to the client 110 is present in the server 130. The client 110 transmits this incoming mail check result to the display unit 1503 for the user.

On the other hand, if the client 110 continues dialing in step C505 and no dial response is received from the server 130 after the ring count exceeds 10 or the dial time exceeds 30, the client 110 decides by the dial response decision unit 1505 that the server 130 cannot respond and terminates the operation.

On the other hand, if in step C504 the client 110 receives a dial response, the client 110 references the ring count and the dial time at the moment when the dial response is received so as to check whether the ring count is within 5 or the dial time is within 15 seconds (step C508). If the ring count is within 5 or the dial time is within 15 seconds when the dial response is received, the client 110 decides that an incoming mail addressed to the client 110 is present in the server 130 (step C509). On the other hand, if in step C508, the ring count exceeds 5 or the dial time exceeds 15 seconds when the dial response is received, then the client 110 decides that no incoming mail addressed to the client 110 is present in the server 130 (step C510).

Next, explanation will be given on the operation of the server 130. In this embodiment, the processing performed when the server receives from the client 110 a ring to check presence/absence of an incoming mail is identical to the operation of the server in the first embodiment, except for that in step S502 and step S503, the server 130 counts the rings from the client 110 and performs calculation by the timer 605. Moreover, in step S506, if no incoming mail addressed to the client 110 is present, the server 130 waits until the dial time reaches 15 seconds or the ring count reaches 5 times (step S508 in FIG. 17) and transmits a control signal to the dial-accept telephone 131 so as to accept the dial (step S509).

Next, explanation will be given on a specific example of the incoming mail check operation performed when no incoming mail is present. In this embodiment. the processing of the incoming mail check operation when no incoming mail is identical to that of the first embodiment, except for that in steps C502 and C503 of FIG. 17, the client counts the rings and performs a calculation by the timer 605. Moreover, in steps S502 and S503, the server 130 counts the rings and performs calculation by the timer 605. Furthermore, in step S506, if the server 130 decides that no incoming mail is present, the server 130 waits until the dial time reaches 15 seconds or the ring counts reaches 5 times and transmits a control signal to the dial-accept telephone 131 so as to accept the dial (step S509).

Next, explanation will be given on a specific example of the incoming mail check operation when an incoming mail is present. The processing of the incoming mail check operation when an incoming mail is present is identical to that of the first embodiment, except for that in steps C502 and C503, the client 110 counts the rings and performs calculation by the timer 1605. Moreover, in steps S502 and S503, the server 130 counts the rings and performs calculation by the timer 1605.

[Embodiment 6]

Description will now be directed to a sixth embodiment with reference to the attached drawings. It should be noted that like components as in the aforementioned embodiments are denoted by like reference symbols and their explanations are omitted. Moreover, the present embodiment has a configuration identical to that of the fourth embodiment in FIG. 11.

Figure 18:
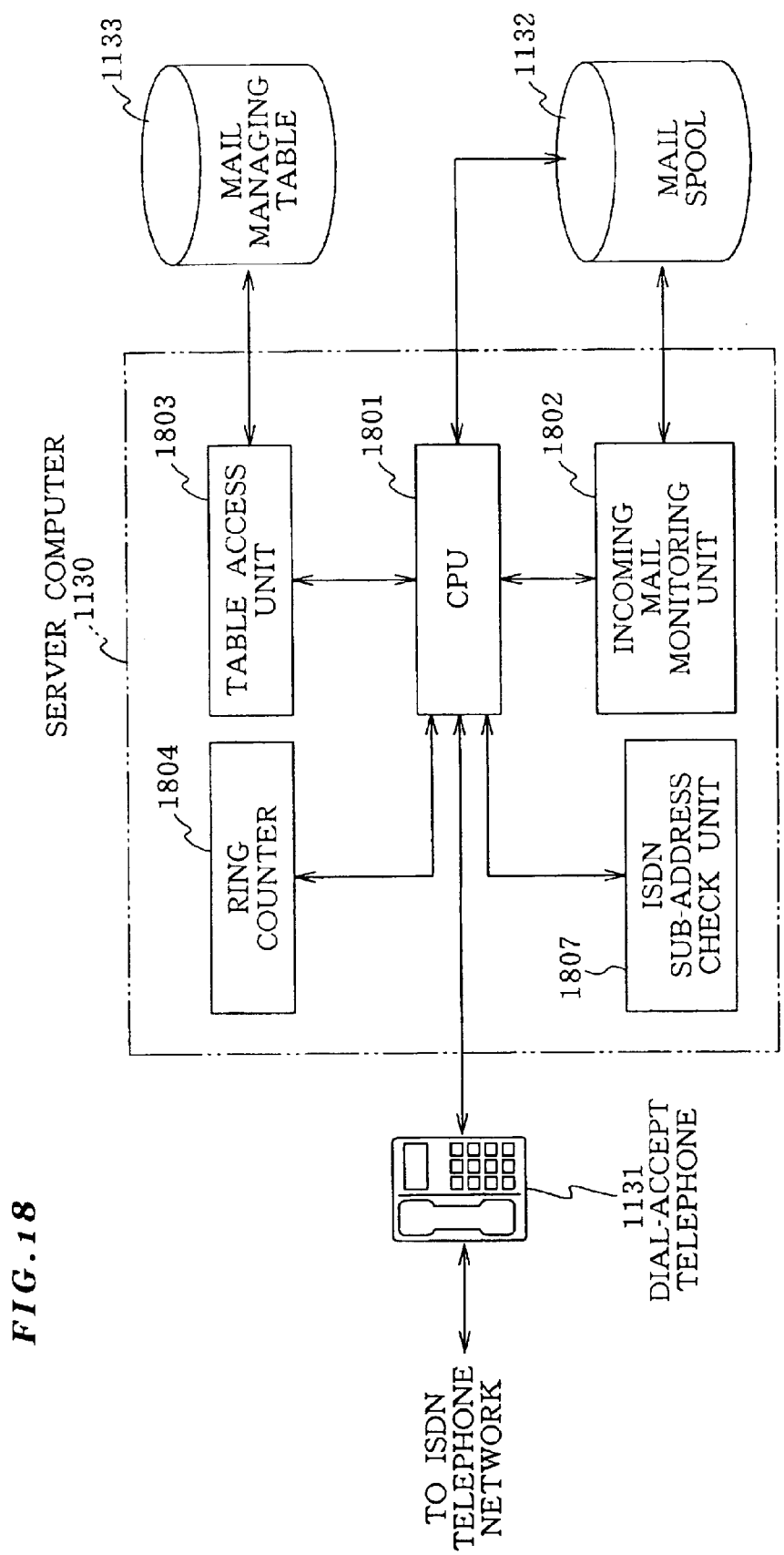
FIG. 18 shows a configuration of a server in the system based on the incoming mail check method using the ring count and the ISDN sub-address.

FIG. 18 shows a configuration of a server 1130 in the system based on the incoming mail check method using the ring count and the ISDN sub-address. Referring to FIG. 18, the server 1130 includes a CPU 1801, an incoming mail monitoring unit 1802, a table access unit 1803, a ring counter 1804, and an ISDN sub-address check unit 1807. The components 1801 to 1804 have identical configuration as the corresponding components (301 to 304) in the first embodiment. Moreover, the ISDN sub-address check unit 1807 has a configuration identical to the ISDN sub-address check unit 1307 of the fourth embodiment in FIG. 12.

Next, explanation will be given on the operation of the e-mail system (incoming e-mail check method) according to the present embodiment. The present embodiment is based on the same assumptions as the fourth embodiment.

Figure 19:
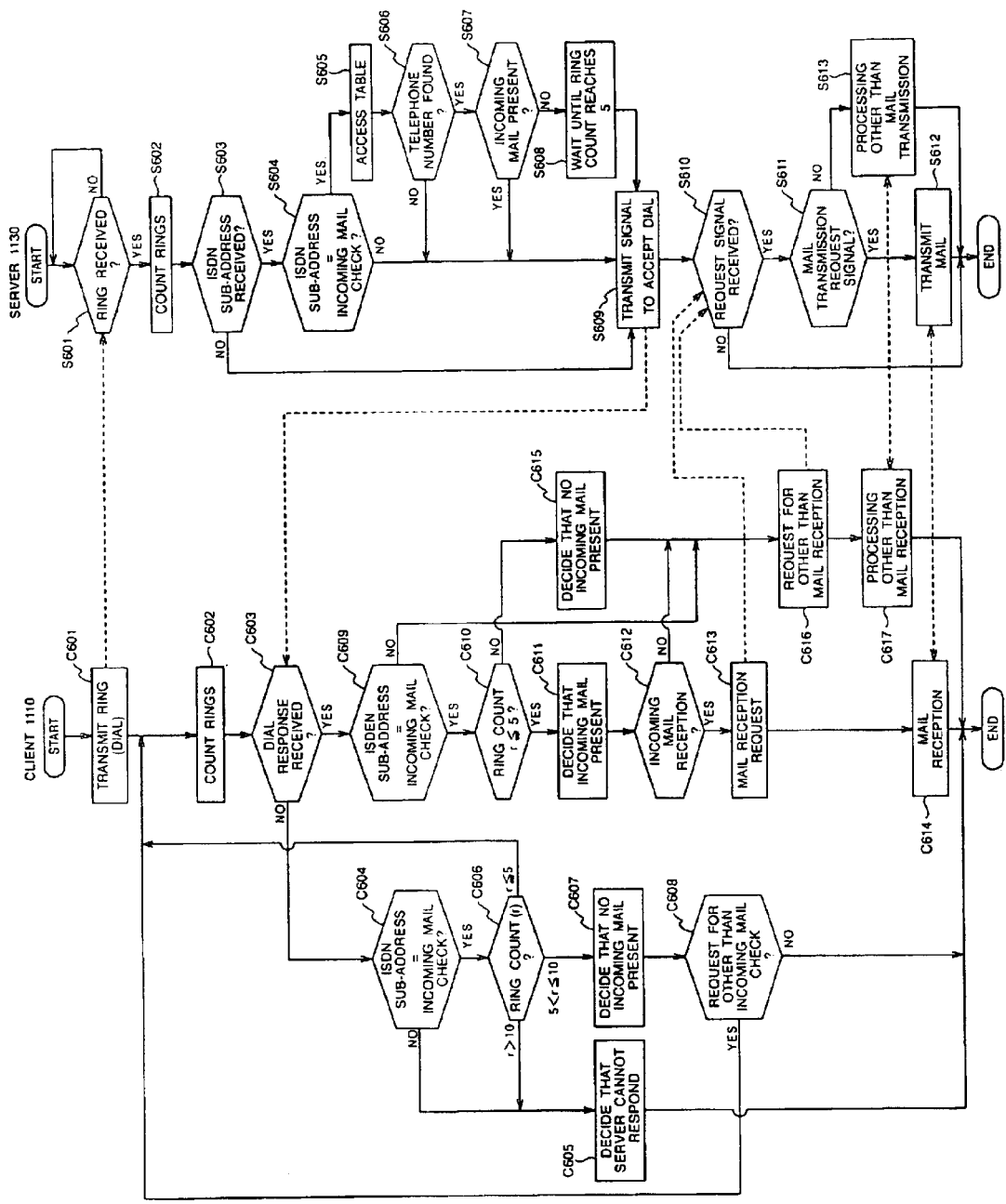
FIG. 19 is a flowchart of the system based on the incoming mail check method using the ring count and the ISDB sub-address.

Next, explanation will be given on the operation of the present embodiment with reference to a configuration of the client 110 in FIG. 2 (client 1110 in FIG. 19), the system configuration in FIG. 11, the configuration of the server 1130 in FIG. 18, a flowchart of FIG. 19, and the mail managing table 1133 in Table 1. Firstly, explanation will be given on the operation of the client 1110. FIG. 19 is a flowchart of the system based on the incoming mail check method using the ring count and the ISDN sub-address.

The processing performed when the client 1110 checks whether an incoming mail addressed to the client 1110 is present in the server 1130 is identical to the operation of the client 1110 in the fourth embodiment, except for that in step C604, if the ISDN sub-address data is an incoming mail check signal, the client 1110 identifies the ring count at that stage. If no dial response is received after the ring count exceeds 5 times, the client 1110 decides by the dial response decision unit 205 that no incoming mail addressed to the client 1110 is present in the server 1130 (step C607 in FIG. 19). At this stage, the client 1110 remains unconnected to the server 1130 but can know that no incoming mail addressed to the client 1110 is present in the server 1130. The client transmits this incoming mail check result to the display unit 203 for the user.

On the other hand, if the client 1110 receives a dial response from the server 1130 in step C603, the client 1110 firstly checks the ISDN sub-address data added after the telephone number transmitted to the server 1130 when dialed (step C609). If the request signal is an incoming mail check request signal, the client 1110 identifies the ring count when the dial of the client 1110 is accepted by the server 1130 (step C610). If the ring count does not within 5 times, the client 1110 decides that an incoming mail addressed to the client 1110 is present (step C611). On the other hand, if the ring count exceeds 5 when the dial response is received in step C610, the client 1110 decides that no incoming mail addressed to the client 1110 is present in the server 1130 (step C615).

Next, explanation will be given on the operation of the server 1130. The processing performed when a new mail has arrived for a specific user in the server 1130 is identical to that of the first embodiment.

The processing performed when the server 1130 receives a ring from the client 1110 to perform an incoming mail check is identical to the operation of the server 1130 in the fourth embodiment, except for that in step S602 the server 1130 calculates the ring count upon reception of the dial request signal from the client 1110. Moreover, in step S607, if it is decided that no incoming mail addressed to the client 1110 is present, the server 1130 waits until the ring count reaches 5 times (step S608) and transmits a control signal to the dial-accept telephone 1131 so as to accept the dial (step S609).

Next, an explanation will be given on a specific example of the incoming mail check operation when no incoming mail is present. The processing performed when no incoming mail is present is identical to that of the fourth embodiment, except for that in step S601, the server 1130 calculates the ring count upon reception of the ring from the client 1110 of User01. Moreover, when the server 1130 checks whether an incoming mail addressed to the client 110 is present (step S607) and no incoming mail addressed to the client 1110 is found, the server 1130 waits until the ring count reaches 5 times (step S608) and transmits a control signal to the dial-accept telephone 1131 so as to accept the dial (step S609).

Next, explanation will be given on a specific example of the incoming mail check operation when an incoming mail is present. The processing performed when an incoming mail is present is identical to that of the fourth embodiment, except for that in step S601, the server 1130 calculates the ring count upon reception of the ring from the client 1110 of User01.

Next, explanation will be given on a specific example of service request other than the incoming mail check service made without performing the incoming mail check. The processing performed for a service request made without performing the incoming mail check is identical to that of the fourth embodiment, except for that in step S601, the server 1130 calculates the ring count upon reception of the ring from the client 1110 of User01.

[Embodiment 7]

Description will now be directed to a seventh embodiment with reference to the attached drawings. It should be noted that like components as in the aforementioned embodiments are denoted by like reference symbols and their explanations are omitted. Moreover, the configuration of the present embodiment is identical to that of the fourth embodiment in FIG. 11.

Figure 20:
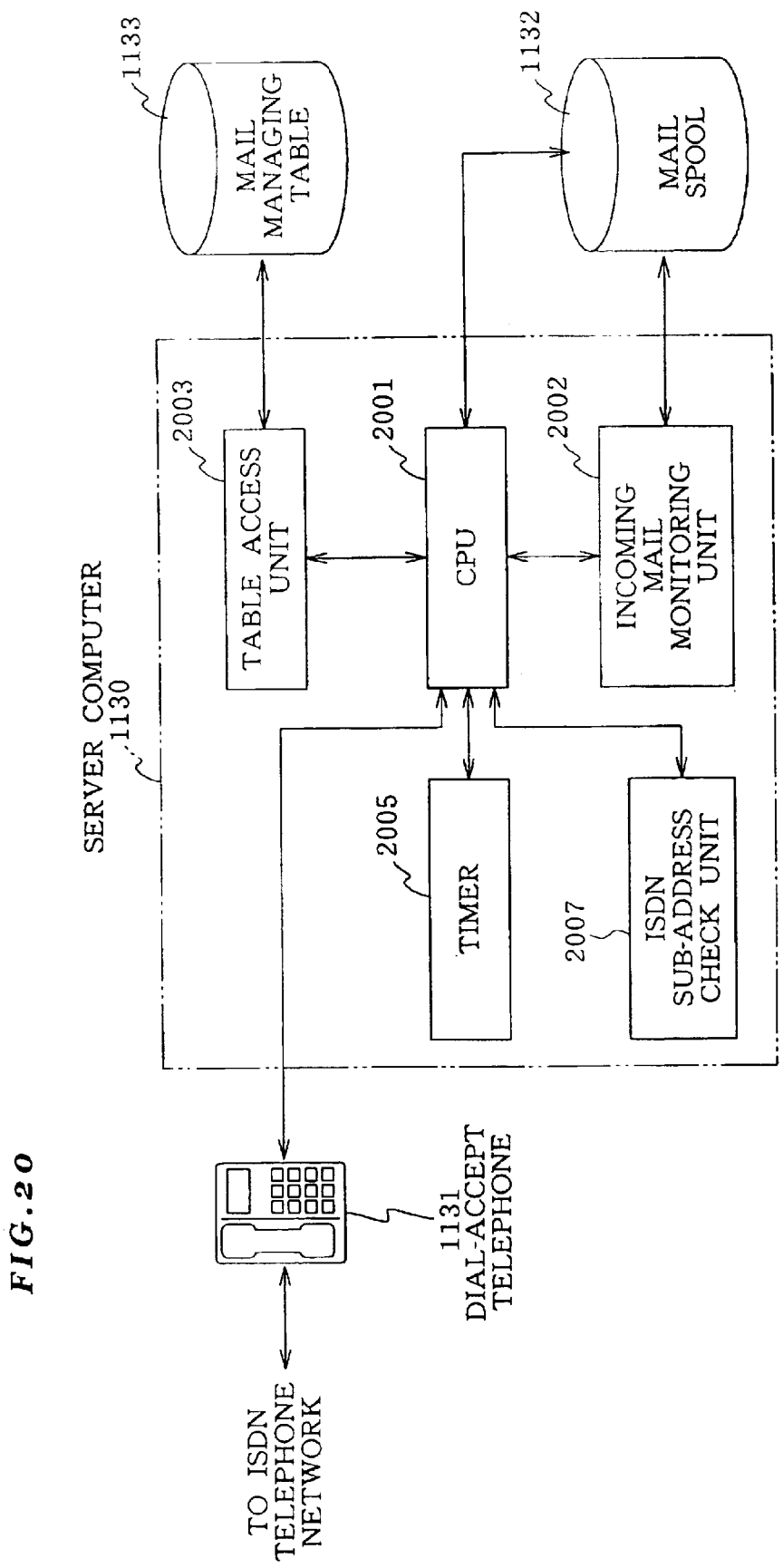
FIG. 20 shows a configuration of a server in the system based on the incoming mail check method using the dial time and the ISDN sub-address.

FIG. 20 shows a configuration of the server 1130 in the system based on the incoming mail check method using the dial time and the ISDN sub-address.

Referring to FIG. 20, the server computer 1130 includes a CPU 2001, an incoming mail monitoring unit 2002, a table access unit 2003, a timer 2005, and an ISDN sub-address check unit 2007.

The components 2001 to 2003 are identical to the corresponding components 301 to 304 in the first embodiment of FIG. 3. Moreover, the timer 2005 has a configuration identical to that of the timer 605 of the second embodiment in FIG. 6. Furthermore, the ISDN sub-address check unit 2007 has a configuration identical to the ISDN sub-address check unit 1207 in the fourth embodiment in FIG. 12.

Next, explanation will be given on the operation of the e-mail system (incoming e-mail check method) according to the present embodiment. The present embodiment is based on the same assumptions as the fourth embodiment.

Next, explanation will be given on the operation of the present embodiment with reference to the configuration of the client 110 in FIG. 5 (client 1110 in FIG. 21), the system configuration in FIG. 11, the configuration of the server 1130 in FIG. 20, a flowchart of FIG. 21, and the mail managing table 1133 in Table 1.

Firstly, explanation will be given on the operation of the client 1110. FIG. 21 is a flowchart of the system based on the incoming mail check method using the dial time and the ISDN sub-address. The processing performed by the client 1110 when checking whether an incoming mail addressed to the client 1110 is present is identical to that of the fourth embodiment, except for that in step C702 of FIG. 21, the client 1110 activates the timer 2005 to count the dial time until a dial response is received from the server 1130.

Moreover, in step C704, if the ISDN sub-address data is an incoming mail check signal, the dial time at that stage is identified. If no dial response is received after the dial time reaches 15 seconds, the client 1110 decides by the dial response decision unit 1205 that no incoming mail addressed to the client 1110 is present in the server 1130 (step C707 of FIG. 21). At this state, the client 1110 remains unconnected to the server 1130 but can know that no incoming mail addressed to the client 1110 is present in the server 1130. The client 1110 transmits this incoming mail check result to the display unit 1203 for the user.

Furthermore, in step C703, if the client 1110 receives a dial response from the server 1130, the client 110 checks a request signal of the ISDN sub-address data added to the telephone number transmitted to the server 1130 when dialed (step C709). If the request signal is a mail transmission request signal, the client 1110 identifies the dial time when the dial is accepted by the server 1130 (step C710). If the dial time is within 15 seconds, the client 1110 decides that an incoming mail addressed to the client 1110 is present (step C711). On the other hand, if the dial time when the dial response is received exceeds 15 seconds, the client 1110 decides that no incoming mail addressed the client 1110 is present in the server 1130 (step C715).

Next, explanation will be given on the operation of the server 1130. The processing performed when a new mail has arrived for a specific user in the server 1130 is identical to that of the first embodiment.

Figure 21:
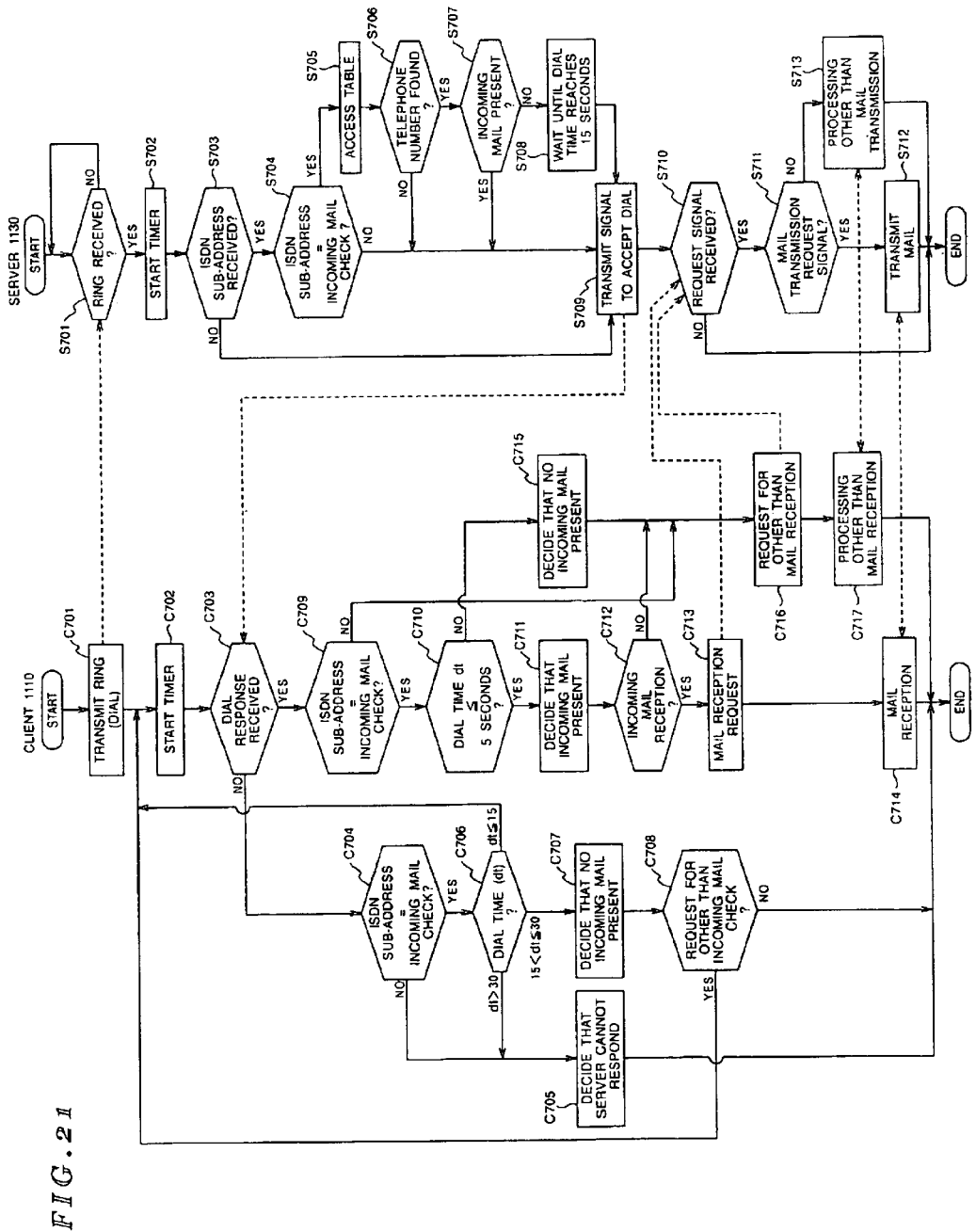
FIG. 21 is a flowchart of the system based on the incoming mail check method using the dial time and the ISDN sub-address.

The processing performed by the server 1130 when receiving a ring for an incoming mail check from the client 1110 is identical to the operation of the server 1130 in the fourth embodiment, except for that in step S701 in FIG. 21, the server activates the timer 2005 for calculating the dial time upon reception of a dial request signal from the client 1110 (step S702). Moreover, if the telephone number of the client 1110 is found in step S707, the server 1130 checks whether an incoming mail addressed to the client 1110 is present (step S707). If no incoming mail addressed to the client 1110 is present, the server waits until the dial time reaches 15 seconds (step S708) and transmits a control signal to the dial-accept telephone 1131 so as to accept the dial from the client 1110 (step S709). On the other hand, if an incoming mail addressed to the client 1110 is present, the server promptly transmits a control signal to the dial-accept telephone 1131 so as to accept the dial from the client 1110 without waiting until the dial time reaches 15 seconds.

Next, explanation will be given on a specific example of the incoming mail check operation when no incoming mail is present. The processing performed is identical to the incoming mail check operation when no incoming mail is present in the fourth embodiment, except for that in step S701, the server 1130 activates the timer 2005 upon reception of a ring from the client 1110 of User01. Moreover, the server 1130 checks whether an incoming mail addressed to the client 1110 is present (step S707), If no incoming mail addressed to the client 1110 is present, the server waits until the dial time reaches 15 seconds (step S708) and transmits a control signal to the dial-accept telephone 1131 so as to accept the dial (step S709).

Next, explanation will be given on a specific example of the incoming mail check operation when an incoming mail is present. The processing performed is identical to the incoming mail check operation when an incoming mail is present in the fourth embodiment, except for that in step S701 of FIG. 21, the server 1130 activates the timer 2005 upon reception of a ring from the client 1110 of User01.

Next, explanation will be given on a specific example of request of a service other than the incoming mail check without performing the incoming mail check. The processing performed in this embodiment is identical to the request operation of a service other than the incoming mail check without performing the incoming mail check in the fourth embodiment, except for that in step S701 of FIG. 21, the server 1130 activates the timer 2005 upon reception of a ring from the client 1110 of User01.

As is clear for those skilled in the art, the present invention is not to be limited to the aforementioned embodiments but may be modified without departing from the technical concept of the present invention.

The present invention having the aforementioned configuration has effects as follows. As the first effect, in the e-mail system and the incoming e-mail check method, when no incoming mail is present in the server, the client need not be connected to the server. This can reduced the occupied state of the line between the client and the server. This is realized as follows. When the client uses a dial to check whether an incoming mail is present in the server and if no incoming mail is present, the dial is not accepted by the server until a predetermined ring count (or dial count, or dial time) is reached, so that client can know that no incoming mail addressed to the client is present at the stage of dialing while the client is not connected to the server.

As the second effect, in the e-mail system and the incoming e-mail check method, the client can promptly connects a service request other than the incoming mail check to the server without being interfered by the incoming mail check processing. This is realized as follows. The client can use the ISDN sub-address function when dialing to the server so as to add an ISDN sub-address after the telephone number, so that the server can identify the service request from the client.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-320106 (Filed on Nov. 10$^{th}$, 1999) including specification, claims, drawings and summary are incorporated herein by reference in its entirety.

What is claimed is:

1. An e-mail system including a plurality of clients and a server having:
    a mail managing table,
    means for moving a record of a client having a higher incoming mail check frequency to an upper line of the mail managing table, and
    means for moving a record of a client having a lower incoming mail check frequency to a lower line of the mail managing table,
    wherein the clients have a dial response decision unit used for checking whether an incoming mail is present in the server in such a manner that if a dial-up telephone is accepted within a predetermined ring count, it is decided that an incoming mail is present, and if the dial-up telephone is not accepted within the predetermined ring count, it is decided that no incoming mail is present.

2. An e-mail system as claimed in claim 1, wherein the server includes means for processing an incoming mail check request dial from a client in such a manner that the dial is accepted within said predetermined ring count according to a signal indicating that an incoming mail is present while the dial is not accepted within the predetermined ring count according to a signal indicating that no incoming mail is present.

3. An e-mail system including a plurality of clients and a server having:
    a mail managing table,
    means for moving a record of a client having a higher incoming mail check frequency to an upper line of the mail managing table, and
    means for moving a record of a client having a lower incoming mail check frequency to a lower line of the mail managing table,
    wherein the clients have a dial response decision unit used for checking whether an incoming mail is present in the server in such a manner that if a dial-up telephone is accepted within a predetermined dial time (time elapse after a dial start), it is decided that an incoming mail is present, and if the dial-up telephone is not accepted within the predetermined dial time, it is decided that no incoming mail is present.

4. An e-mail system as claimed in claim 3, wherein the server includes means for processing an incoming mail check request dial from a client in such a manner that the dial is accepted within the predetermined dial time according to a signal indicating that an incoming mail is present while the dial is not accepted within the predetermined dial time according to a signal indicating that no incoming mail is present.

5. An e-mail system including a plurality of clients and a server having:
    a mail managing table,
    means for moving a record of a client having a higher incoming mail check frequency to an upper line of the mail managing table, and
    means for moving a record of a client having a lower incoming mail check frequency to a lower line of the mail managing table,
    wherein the clients have a dial response decision unit used for checking whether an incoming mail is present in the server in such a manner that if a dial-up telephone is accepted within a predetermined dial count, it is decided that an incoming mail is present, and if the dial-up telephone is not accepted within the predetermined dial time, it is decided that no incoming mail is present.

6. An e-mail system including a plurality of clients and a server having:
    a mail managing table,
    means for moving a record of a client having a higher incoming mail check frequency to an upper line of the mail managing table, and
    means for moving a record of a client having a lower incoming mail check frequency to a lower line of the mail managing table,
    wherein the clients have a dial response decision unit for deciding that an incoming mail is present if a dial number having an ISDN sub-address transmitted by a client is accepted by the server and that no incoming mail is present if the dial number is not accepted by the server.

7. An e-mail system as claimed in claim 6, wherein the server has means for processing an incoming mail check request having said ISDN sub-address from the client in such a manner that the dial is accepted if an incoming mail is present and the dial is not accepted if no incoming mail is present.

8. An incoming e-mail check method comprising:
   a step for holding a record of a client having a higher incoming mail check frequency in an upper line of a mail managing table,
   a step for holding a record of a client having a lower incoming mail check frequency in a lower line of the mail managing table, and
   a dial response decision step for a user to check whether an incoming mail is present in the server, i.e., if a dial-up telephone is accepted within a predetermined ring count, it is decided that an incoming mail is present and if the dial-up telephone is not accepted within the predetermined ring count, it is decided that no incoming mail is present.

9. An incoming e-mail check method as claimed in claim 8, the method further comprising a step for processing an incoming mail check request dial from a client in such a manner that the dial is accepted within said predetermined ring count according to a signal indicating that an incoming mail is present while the dial is not accepted within the predetermined ring count according to a signal indicating that no incoming mail is present.

10. An incoming e-mail check method comprising:
    a step for holding a record of a client having a higher incoming mail check frequency in an upper line of a mail managing table,
    a step for holding a record of a client having a lower incoming mail check frequency in a lower line of the mail managing table, and
    dial response decision step for a client to check whether an incoming mail is present in the server in such a manner that if a dial-up telephone is accepted within a predetermined dial time (time elapse after a dial start), it is decided that an incoming mail is present, and if the dial-up telephone is not accepted within the predetermined dial time, it is decided that no incoming mail is present.

11. An incoming e-mail check method as claimed in claim 10, the method further comprising a step for processing an incoming mail check request dial from a client in such a manner that the dial is accepted within said predetermined dial time according to a signal indicating that an incoming mail is present while the dial is not accepted within the predetermined dial time according to a signal indicating that no incoming mail is present.

12. An incoming e-mail check method comprising:
    a step for holding a record of a client having a higher incoming mail check frequency in an upper line of a mail managing table,
    a step for holding a record of a client having a lower incoming mail check frequency in a lower line of the mail managing table, and
    dial response decision step for checking whether an incoming mail is present in the server in such a manner that if a dial-up telephone is accepted within a predetermined dial count, it is decided that an incoming mail is present, and if the dial-up telephone is not accepted within the predetermined dial time, it is decided that no incoming mail is present.

13. An incoming e-mail check method comprising:
    a step for holding a record of a client having a higher incoming mail check frequency in an upper line of a mail managing table,
    a step for holding a record of a client having a lower incoming mail check frequency in a lower line of the mail managing table, and
    dial response decision step for deciding that an incoming mail is present if a dial number having an ISDN sub-address transmitted by a client is accepted by the server and that no incoming mail is present if the dial number is not accepted by the server.

14. An incoming e-mail check method as claimed in claim 13, the method further comprising a step for processing an incoming mail check request having said ISDN sub-address from a client in such a manner that the dial is accepted if an incoming mail is present and the dial is not accepted if no incoming mail is present.

15. An incoming e-mail check method comprising the steps of:
    monitoring information as to whether or not monitored information, including incoming mail for a client, has arrived at a server;
    requesting a check request of the incoming mail from the client to the server;
    rejecting an access request from the client to the server when no incoming mail to the client, for which said check request is carried out, is within the monitored information; and
    accepting an access request from the client to the server for receiving the incoming mail only when the incoming mail, for which said check request is carried out, is within the monitored information.

16. The incoming e-mail check method, as recited in claim 15, further comprising giving a higher priority for access request to a client having a higher check request frequency that to another client having a lower check request frequency.

17. An e-mail system comprising:
    means for monitoring information as to whether or not monitored information, including incoming mail for a client, has arrived at a server;
    means for requesting a check request of the incoming mail from the client to the server;
    means for rejecting an access request from the client to the server when no incoming mail to the client, for which said check request is carried out, is within the monitored information; and
    means for accepting an access request from the client to the server for receiving the incoming mail only when the incoming mail, for which said check request is carried out, is within the monitored information.

18. The e-mail system, as recited in claim 17, further comprising means for giving a higher priority for access request to a client having a higher check request frequency that to another client having a lower check request frequency.

* * * * *